US005337248A

United States Patent [19]

Eckert, Jr. et al.

[11] Patent Number: 5,337,248

[45] Date of Patent: Aug. 9, 1994

[54] MAILING MACHINE INCLUDING SHEET FEEDING SPEED CALIBRATING MEANS

[75] Inventors: Alton B. Eckert, Jr., New Fairfield; Dennis M. Gallagher, Danbury; Thomas M. Pfeifer, Bridgeport; Richard P. Schoonmaker, Wilton, all of Conn.

[73] Assignee: Pitney Bowes Inc., Stamford, Conn.

[21] Appl. No.: 841,911

[22] Filed: Feb. 25, 1992

[51] Int. Cl.[5] .............................................. G06F 15/20

[52] U.S. Cl. .................................... 364/468; 271/227; 364/469; 364/571.01

[58] Field of Search .................... 271/227; 364/464.02, 364/468, 469, 559, 571.01

[56] References Cited

U.S. PATENT DOCUMENTS

| | | | |
|---|---|---|---|
| 4,630,813 | 12/1986 | Watanabe et al. | 271/227 |
| 4,774,446 | 9/1988 | Salazar et al. | 318/561 |
| 4,787,311 | 11/1988 | Mol | 101/232 |
| 4,864,505 | 9/1989 | Miller et al. | 364/464.02 |
| 5,245,257 | 9/1993 | Tobise | 318/255 |

*Primary Examiner*—Edward R. Cosimano

*Attorney, Agent, or Firm*—Donald P. Walker; Melvin J. Scolnick; Robert E. Meyer

[57] ABSTRACT

A mailing machine base comprising, structure for feeding a sheet having a leading edge and a trailing edge in a path of travel, the sheet feeding structure including a roller, the sheet feeding structure including structure for driving the roller at a desired sheet feeding speed corresponding to a desired reference voltage, structure for controlling the sheet feeding structure, the controlling structure including a microprocessor connected to the roller driving structure, the controlling structure including structure for sequentially sensing the leading and trailing edges of the sheet in the path of travel and providing corresponding successive signals to the microprocessor, the sheet having a predetermined length from the leading edge to the trailing edge thereof; and the microprocessor programmed for providing a predetermined reference voltage corresponding to the desired sheet feeding speed, counting a time interval in response to receiving the successive leading and trailing edge signals, determining whether the counted time interval and the desired time interval are substantially equal, and storing the predetermined reference voltage as the desired reference voltage if the counted and desired time intervals are substantially equal.

24 Claims, 16 Drawing Sheets

MAILING MACHINE INCLUDING SHEET FEEDING SPEED CALIBRATING MEANS

BACKGROUND OF THE INVENTION

The present invention is generally concerned with apparatus including sheet feeding and printing structures, and more particularly with a mailing machine including a base adapted to have mounted thereon a postage meter, and improved drive systems and control structures therefor.

This application is one of the following four, related, U.S. patent applications concurrently filed by A. Eckert, Jr. et. al. and assigned to the assignee of the present invention: U.S. Ser. No. 07/841,911 (Applicants file C-674) for Mailing Machine Including Sheet Feeding Speed Calibrating Means; Ser. No. 07/841,315 (Applicants file C-775) for Mailing Machine Including Printing Speed Calibrating Means; Ser. No. 07/841,915 (Applicants file C-687) for Mailing Machine Including Skewed Sheet Detection Means and Ser. No. 07/841,912 (Applicants file C-692) for Mailing Machine Including Short Sheet Length Detecting Means. In addition, this application is related to each of the following five U.S. patent applications filed Dec. 19, 1991 by A. Eckert, Jr., et. al. and assigned to the assignee of the present invention: Ser. No. 07/810,257, now U.S. Pat. No. 5,251,554 for Mailing Machine Including Shutter Bar Moving Means; Ser. No. 07/810,255, now U.S. Pat. No. 5,295,060 for Mailing Machine Including Sheet Feeding Control Means; Ser. No. 07/810,256 (Applicants file C-862) for Mailing Machine Including Shutter Bar Control System; Ser. No. 07/810,258 (Applicants file C-863) for Mailing Machine Including Printing Drum Acceleration And Constant Velocity Control System; and Ser. No. 07/810,597, now U.S. Pat. No. 5,268,836 for Mailing Machine Including Printing Drum Deceleration And Coasting Control System.

As shown in U.S. Pat. No. 4,774,446, for a Microprocessor Controlled D.C. Motor For controlling Printing Means, issued Sep. 27, 1988 to Salazar, et. al. and assigned to the assignee of the present invention, there is described a mailing machine which includes a base and a postage meter removably mounted thereon. The base includes sheet feeding structure for feeding a sheet in a downstream path of travel through the machine, and includes two sheet sensing structures located a known distance from one another along the path of travel. And, the postage meter includes a rotary printing drum for printing postage indicia on a sheet while feeding the sheet downstream in the path of travel therebeneath. The sensors successively sense the sheet in the path of travel and provide successive signals to a microprocessor to permit the time lapse between the signals to be used for calculating a count corresponding to the sheet feeding speed. Moreover, the base includes a d.c. motor for driving the postage printing drum, and an encoder coupled to the drum drive shaft for providing signals indicative of the position thereof to a counting circuit which, in turn, provides a count to the microprocessor indicative of the peripheral speed of the postage printing drum. And, the computer is programmed to successively sample the counts corresponding to the sheet feeding speed and the speed of the periphery of the drum to adjust the motor drive between sampling time instants and generate a motor drive signal for causing the motor to drive the drum at a velocity which matches the peripheral speed of the drum with the sheet feeding speed.

Thus it is known in the art to provide a closed loop, sampled data, feed back control system in a mailing machine base for continuously matching the peripheral speed of a postage printing drum to the feeding speed of a sheet.

As shown in U.S. Pat. No. 4,864,505 for a Postage Meter Drive System, issued Sep. 5, 1989 to Miller, et. al. and assigned to the assignee of the present invention, there is described a mailing machine base having a postage meter mounted thereon, wherein the base includes a first d.c. motor for driving the postage printing drum via a drum gear in the meter, a second d.c. motor for driving the structure for feeding a sheet through the machine, and a third, stepper, motor for driving a linkage system connected in bearing engagement with the postage meter shutter bar for moving the shutter bar out of and into locking engagement with the drum drive gear.

Thus it is known in the art to provide three separate motors for driving the sheet feeding, shutter bar moving and postage printing drum driving structures in a mailing machine base. And, it is known to provide a stepper motor for driving a linkage system to move the postage meter shutter bar into and out of locking engagement with the drum drive gear.

As shown in U.S. Pat. No. 4,787,311, for a Mailing Machine Envelope Transport System, issued Nov. 29, 1988 to Hans C. Mol and assigned to the assignee of the present invention. There is described a mailing machine base having a postage meter mounted thereon, wherein the time lapse between spaced sensors in the path of travel of a sheet is utilized by a microprocessor for calculating a sheet feeding speed, and wherein the speed of a stepper motor, connected for driving the postage printing drum under the control of the microprocessor, is adjusted to match the peripheral speed of the drum with the sheet feeding speed.

Thus it is known in the art to provide a microprocessor driven stepper motor in a mailing machine base for driving a postage printing drum at a peripheral speed which matches the speed of a sheet fed therebeneath.

As noted above, the structures utilized in the prior art for sheet feeding, shutter bar moving and postage printing drum driving purposes include the sophisticated feedback control system of the '446 patent, which continuously controls the motion of a postage printing drum to conform the same to a trapezoidal-shaped velocity versus time profile, having a constant velocity portion which results in the peripheral speed of the drum matching the speed of sheets fed through a mailing machine, and include the relatively inexpensive alternative of the '311 patent, which includes a stepper motor operated for matching the peripheral speed of the drum to the sheet feeding speed without regard to the acceleration and deceleration velocity versus time profile characteristics of the drum. Each of such systems has its drawbacks, for example, encoders are expensive, as are software solutions which take into consideration the technical specifications of the motors controlled thereby. And both of such expenses are major considerations in competitively pricing mailing machines for the marketplace. Further, stepper motors are noisy, as are linkage systems, which tend to suffer from wear and tear over time and become noisy. Moreover, the combination of a stepper motor and linkage system for driving a shutter bar tends to cause the moving shutter bar to be noisy. In addition to being irritable to customers, noise normally signals wear and tear and, since mailing machines must normally withstand the wear and tear of many thousands of operational cycles in the course of their expected useful life, maintenance problems are compounded by the use of noisy systems in mailing machines. And, such considerations are of major importance in generating and retaining a high level of customer satisfaction with the use of mailing machines. Accordingly:

an object of the invention is to provide an improved, low cost, low operational noise level, mailing machine base;

another object is to provide improved microprocessor controlled sheet feeding, shutter bar moving and postage printing drum driving structures in a mailing machine base;

another object is to provide a microprocessor controlled d.c. motor for accelerating sheet feeding rollers at a substantially constant rate to a substantially constant sheet feeding speed;

another object is to provide a microprocessor controlled shutter bar moving system in a mailing machine base;

another object is to provide a microprocessor controlled d.c. motor for timely accelerating a postage meter drum from rest, in its home position, to a substantially constant velocity, and then maintaining the velocity constant;

another object is to provide a microprocessor controlled d.c. motor for timely controlling deceleration of a postage printing drum from a substantially constant velocity to rest in its home position;

another object is to provide a method and apparatus for calibrating the sheet feeding speed of sheet feeding rollers to conform the speed to a predetermined speed;

another object is to provide a method and apparatus for calibrating the printing speed of a rotary printing drum to conform the printing speed to the speed of a sheet fed thereto;

another object is to provide a method and apparatus for detecting skewed sheets fed to a mailing machine base; and another object is to provide a method and apparatus for detecting sheets of insufficient length fed to a mailing machine for printing postage indicia thereon.

SUMMARY OF THE INVENTION

A mailing machine base comprising, means for feeding a sheet having a leading edge and a trailing edge in a path of travel, the sheet feeding means including a roller, the sheet feeding means including means for driving the roller at a desired sheet feeding speed corresponding to a desired reference voltage, means for controlling the sheet feeding means, the controlling means including a microprocessor connected to the roller driving means, the controlling means including means for sequentially sensing the leading and trailing edges of the sheet in the path of travel and providing corresponding successive signals to the microprocessor, the sheet having a predetermined length from the leading edge to the trailing edge thereof; and the microprocessor programmed for providing a predetermined reference voltage corresponding to the desired sheet feeding speed, counting a time interval in response to receiving the successive leading and trailing edge signals, determining whether the counted time interval and the desired time interval are substantially equal, and storing the predetermined reference voltage as the desired reference voltage if the counted and desired time intervals are substantially equal.

BRIEF DESCRIPTION OF THE DRAWINGS

As shown in the drawings wherein like reference numerals designate like or corresponding parts throughout the several views.

DESCRIPTION OF THE PREFERRED EMBODIMENTS

Figure 1:
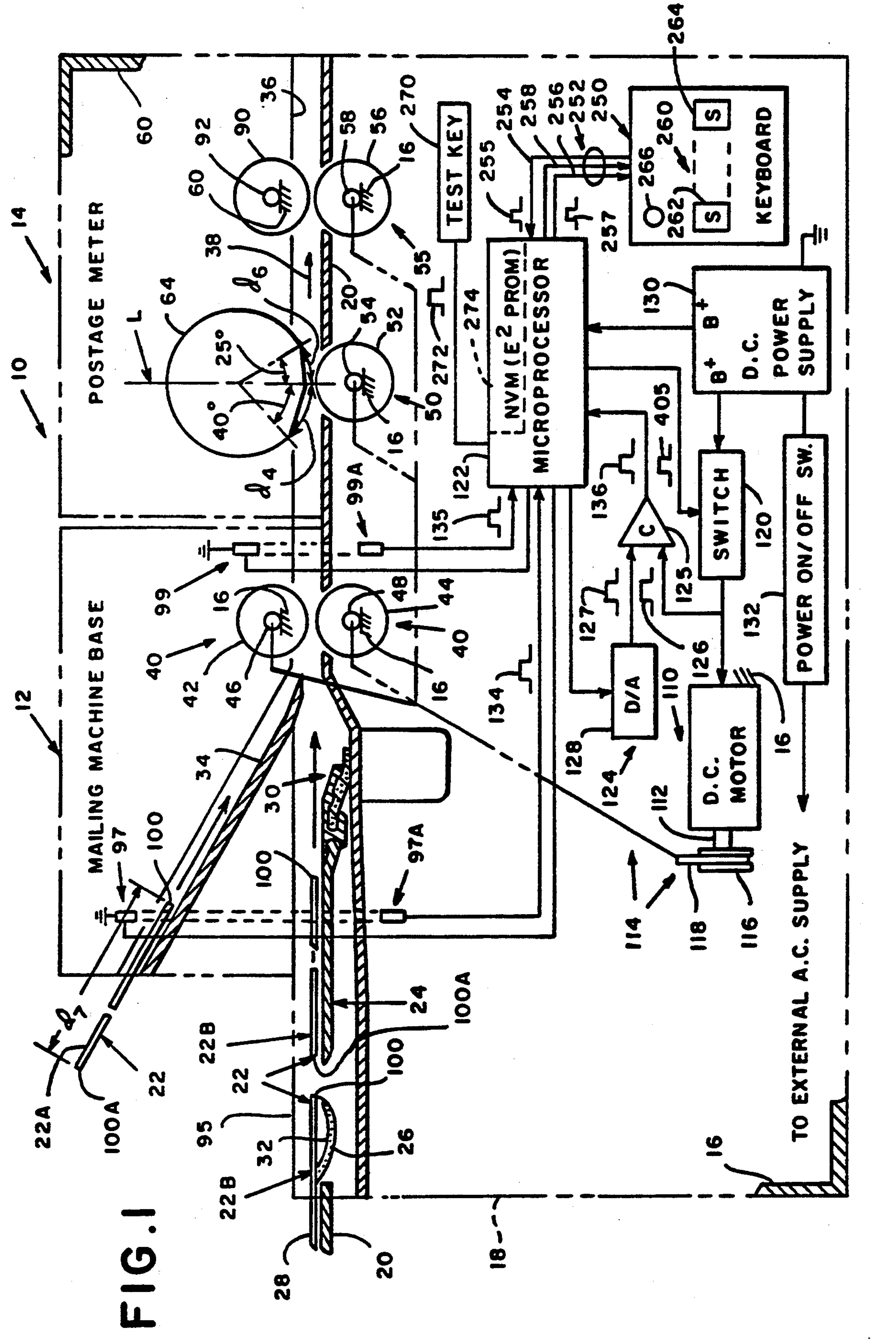
FIG. 1 is a schematic elevation view of a mailing machine according to the invention, including a base having a postage meter mounted thereon, showing the sheet feeding structure of the base and the postage printing drum of the meter, and showing a microprocessor for controlling the motion of the sheet feeding structure and the drum.

As shown in FIG. 1, the apparatus in which the invention may be incorporated comprises a mailing machine 10 including a base 12 and a postage meter 14 which is removably mounted on the base 12.

The base 12 (FIG. 1) generally includes suitable framework 16 for supporting the various components thereof including a housing 18, and a horizontally-extending deck 20 for supporting sheets 22 such as cut tapes 22A, letters, envelopes 22B, cards or other sheet-like materials, which are to be fed through the machine 10. Preferably, the base 12 also includes conventional structure 24 for selectively deflecting an envelope flap 26 from an envelope body 28 together with suitable structure 30 for moistening the strip of glue 32 adhered to the envelope flap 26, preparatory to feeding the envelope 22B through the machine 10. In addition, the base 12 preferably includes an elongate, angularly-extending, deck 34 for receiving and guiding cut tapes 22A past the moistening structure 30 preparatory to being fed through the machine 10. When mounted on the base 12, the postage meter 14 forms therewith a 36 slot through which the respective cut tapes 22A, envelopes 22B and other sheets 22 are fed in a downstream path of travel 38 through the machine 10.

For feeding sheets 22 into the machine 10, the base 12 preferably includes input feeding structure 40 including opposed, upper and lower, drive rollers, 42 and 44, which are axially spaced parallel to one another and conventionally rotatably connected to the framework 16, as by means of shafts, 46 and 48, so as to extend into and across the path of travel 38, downstream from the cut tape receiving deck 34. In addition, the base 12 includes conventional intermediate feeding structure 50, including a postage meter input roller 52, known in the art as an impression roller, which is suitably rotatably connected to the framework 16, as by means of a shaft 54, so as to extend into and across the path of travel 38, downstream from the lower input drive roller 44. Still further, for feeding sheets 22 from the machine 10, the base 12 includes conventional output feeding structure 55, including an output feed roller 56 which is suitably rotatably connected to the framework 16, as by means of a shaft 58, so as to extend into and across the path of travel 38, downstream from the impression roller 52.

Figure 2:
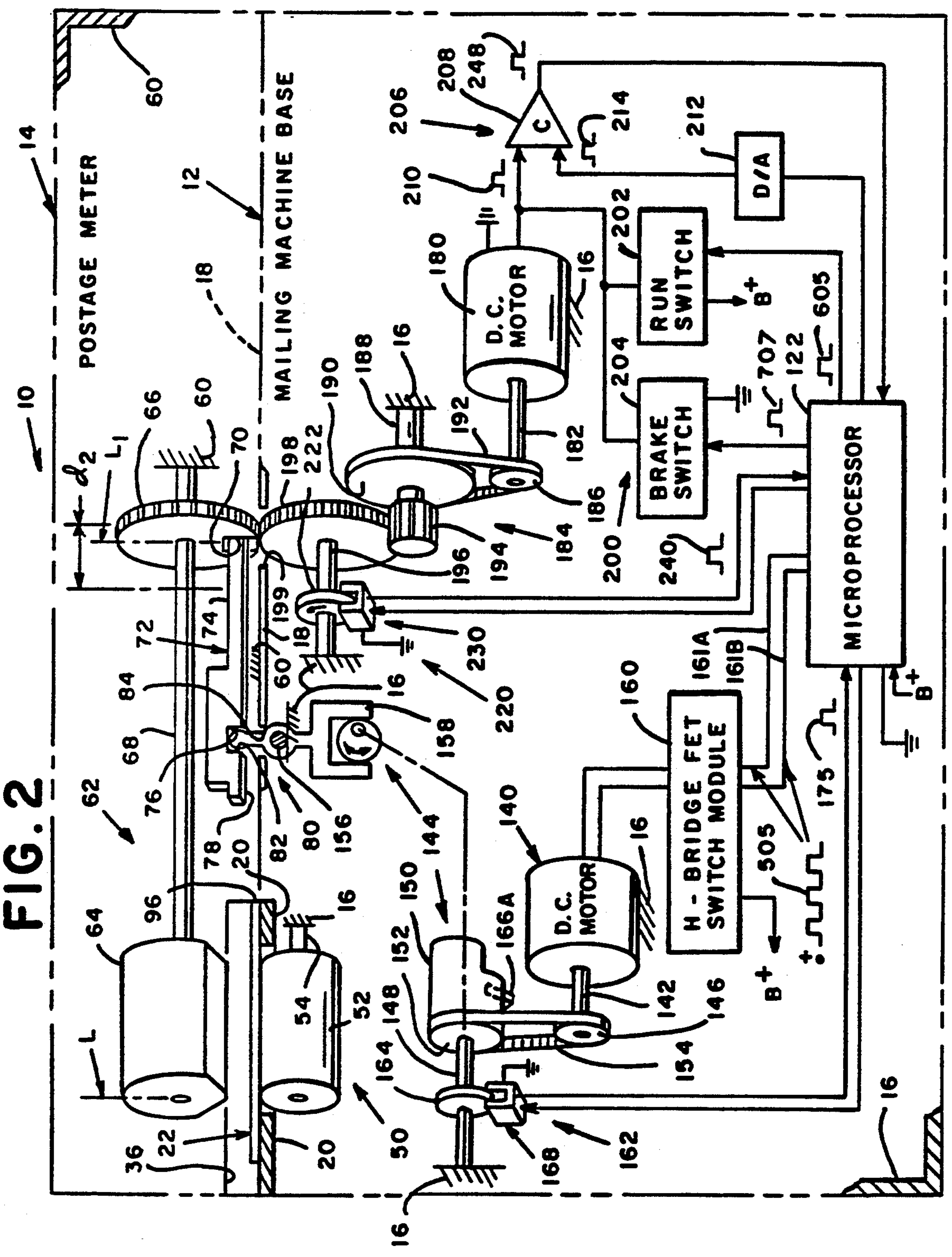
FIG. 2 is a schematic end view of the mailing machine of FIG. 1, showing the postage printing drum, drum drive gear and shutter bar of the meter, and showing the shutter bar and drum drive systems of the base.

As shown in FIG. 2, the postage meter 14 comprises framework 60 for supporting the various components thereof including rotary printing structure 62. The rotary printing structure 62 includes a conventional postage printing drum 64 and a drive gear 66 therefor, which are suitably spaced apart from one another and mounted on a common drum drive shaft 68. The shaft 68 is located above and axially extends parallel to the impression roller drive shaft 54 when the postage meter 14 is mounted on the base 12. The printing drum 64 is conventionally constructed and arranged for feeding the respective sheets 22 (FIG. 1) in the path of travel 38 beneath the drum 64, and for printing postage data, registration data or other selected indicia on the upwardly disposed surface of each sheet 22. When the postage meter 14 is mounted on the base 12, the printing drum 64 is located in a home position thereof which is defined by an imaginary vertical line L extending through the axis thereof, and the impression roller 52 is located for urging each sheet 22 into printing engagement with the printing drum 64 and for cooperating therewith for feeding sheets 22 through the machine 10. The drum drive gear 66 (FIG. 2) has a key slot 70 formed therein, which is located vertically beneath the drum drive shaft 68 and is centered along an imaginary vertical line $L_1$ which extends parallel to the home position line L of the printing drum 64. Thus, when the key slot 70 is centered beneath the axis of the drum drive shaft 68, the postage meter drum 64 and drive gear 66 are located in their respective home positions. The postage meter 14 additionally includes a shutter bar 72, having an elongate key portion 74 which is transversely dimensioned to fit into the drive gear's key slot 70. The shutter bar 72, which is conventionally slidably connected to the framework 60 within the meter 14, is reciprocally movable toward and away from the drum drive gear 66, for moving the shutter bar's key portion 74 into and out of the key slot 70, under the control of the mailing machines base 12, when the drum drive gear 66 is located in its home position. To that end, the shutter bar 72 has a channel 76 formed therein from its lower surface 78, and, the base 12 includes a movable lever arm 80, having an arcuately-shaped upper end 82, which extends upwardly through an aperture 84 formed in the housing 18. When the meter 14 is mounted on the base 10, the lever arm's upper end 82 fits into the channel 76, in bearing engagement with the shutter bar 72, for reciprocally moving the bar 72. As thus constructed and arranged, the shutter bar 72 is movable to and between one position, wherein shutter bar's key portion 74 is located in the drum drive gear' key slot 70, for preventing rotation of the drum drive gear 66, and thus the drum 64, out of their respective home positions, and another position, wherein the shutter bar's key portion 74 is located out of the key slot 70, for permitting rotation of the drum drive gear 66, and thus the drum 64.

The postage meter 14 (FIG. 1) additionally includes an output idler roller 90 which is suitably rotatably connected to the framework 60, as by means of an idler shaft 92 which axially extends above and parallel to the output roller drive shaft 58, for locating the roller 90 above and in cooperative relationship with respect to the output feed roller 56, when the postage meter 14 is mounted on the base 12. Further, the base 12 additionally includes conventional sheet aligning structure including a registration fence 95 defining a direction of the path of travel 38, i.e., extending parallel to the fence 95, and against which an edge 96 (FIG. 2) of a given sheet 22 is normally urged when fed to the mailing machine 10 for aligning the given sheet 22 with the direction of the path of travel 38. Moreover, the base 12 (FIG. 1) preferably includes sheet detection structure 97, including a suitable sensor 97A, located upstream from the input feed rollers, 42 and 44, for detecting the presence of a sheet 22 being fed to the machine 10. And, the base 12 preferably includes sheet feeding trip structure 99, including a suitable sensor 99A, located downstream from the input feed rollers, 42 and 44, and preferably substantially one-half of an inch from, and thus closely alongside of, the registration fence 94, for sensing the leading edge 100 and trailing edge 100A of each sheet 22 fed thereby into the mailing machine 10.

As shown in FIG. 1, for driving the input, intermediate and output sheet feeding structures 40, 50 and 55, the mailing machine base 12 preferably includes a conventional d.c. motor 110 having an output shaft 112, and a suitable timing belt and pulley drive train system 114 interconnecting the drive roller shafts 46, 48, 54 and 58 to the motor shaft 112. In this connection, the drive train system 114 includes, for example, a timing pulley 116 fixedly secured to the motor output shaft 112 for rotation therewith and a suitable timing belt 118 which is looped about the pulley 116 and another timing pulley of the system 114 for transmitting motive power from the pulley 116, via the remainder of the belt and pulley system 114, to the drive roller shafts 46, 48, 54 and 58.

As shown in FIG. 1, for controlling the angular velocity of the sheet feeding rollers 42, 44, 52 and 56, and thus the speed at which sheets 22 are fed into, through and from the machine 10, the mailing machine base 12 preferably includes a field effect transistor (FET) power switch 120 which is conventionally electrically connected to the d.c. motor 110 for energization and deenergization thereof. In addition, for controlling the sheet feeding speed, the base 12 includes the sheet detection structure 97 and sheet feeding trip structure 99, a microprocessor 122 to which the FET power switch 120, sheet detection structure 97 and sheet feeding structure 99 are conventionally electrically connected, and a voltage comparing circuit 124 which is conventionally electrically interconnected between the microprocessor 122 and d.c. motor 110. Preferably, the voltage comparing circuit 124 includes a conventional solid state comparator 125, having the output terminal thereof connected to the microprocessor 122. In addition, the comparator 125 has one of the input terminals thereof connected to the d.c. motor 110, for sampling the motor's back-e.m.f. voltage and providing a signal, such as the signal 126, to the comparator 125 which corresponds to the magnitude of the back-e.m.f. voltage. And, the comparator 125 has the other of the input terminals thereof connected to the microprocessor 122 via a suitable digital to analog converter 128, for providing the comparator 125 with a signal, such as the signal 127, which corresponds to a predetermined reference voltage. Further, the base 12 includes a conventional d.c. power supply 130, to which the FET power switch 120 and microprocessor 122 are suitably connected for receiving d.c. power. Moreover, the base 12 includes a manually operable on and off power switch 132, which is electrically connected to the d.c. supply 130 and is conventionally adapted to be connected to an external source of supply of a.c. power for energizing and deenergizing the d.c. supply 130 in response to manual operation of the power switch 132. In addition, for controlling the sheet feeding speed, the microprocessor 122 is preferably programmed, as hereinafter discussed in greater detail, to respond to receiving a sheet detection signal, such as the signal 134, from the sensor 97A, to receiving a sheet feeding signal, such as the signal 135 from the sensor 99A, and to receiving successive positive or negative comparison signals, such as the signal 136 from the comparator 125, for causing the d.c. motor 110 to drive each of the sheet feeding rollers 42, 44, 52 and 56 at the same peripheral speed for feeding sheets 22 through the machine 10 at a constant speed.

As shown in FIG. 2, for driving the shutter bar lever arm 80, the mailing machine base 12 preferably includes a conventional d.c. motor 140, having an output shaft 142, and includes a drive system 144 interconnecting the lever arm 80 to the motor shaft 142. The drive system 144 preferably includes a timing pulley 146 which is suitably fixedly connected to the output shaft 142 for rotation therewith. In addition, the drive system 144 includes a cam shaft 148, which is conventionally journaled to the framework 16 for rotation in place, and includes a rotary cam 150, which is conventionally connected to the cam shaft 148 for rotation therewith. Moreover, the drive system 144 includes a timing pulley 152, which is suitably fixedly connected to the cam shaft 148 for rotation thereof. Preferably, the rotary cam 150 and pulley 152 are integrally formed as a single piece-part which is injection molded from a suitable plastic material. In addition, the drive system 144 includes a conventional timing belt 154, which is suitably looped about the pulleys, 146 and 152, for transmitting rotary motion of the motor drive shaft 142 to the cam shaft 148, and thus to the rotary cam 150. Still further, the drive system 144 includes the lever arm 80, which is preferably conventionally pivotally attached to the framework 16, as by means of a pin 156, and includes a yoke portion 158 depending therefrom. Preferably, the rotary cam 150 is disposed in bearing engagement with the yoke portion 158 for pivoting the yoke portion 158, and thus the lever arm 80, both clockwise and counterclockwise about the pin 156.

Figure 3:
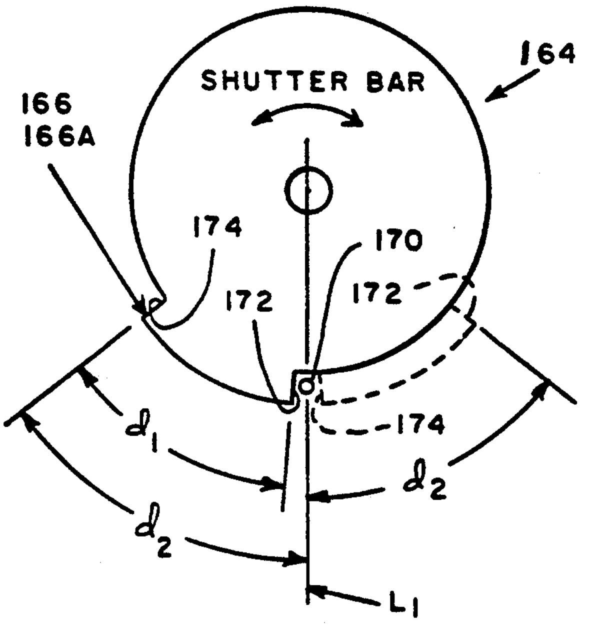
FIG. 3 is a schematic view of structure for sensing the angular position of the shutter bar cam shaft of FIG. 2, and thus the location of the shutter bar relative to the drum drive gear.

For controlling movement of the shutter bar lever arm 80 (FIG. 2), and thus movement of the shutter bar 72, into and out of the drum drive gear slot 70, the mailing machine 12 includes the microprocessor 122, and includes the sheet feeding trip structure 99 (FIG. 1) which is conventionally electrically connected to the microprocessor 122. In addition, for controlling shutter bar movement, the machine 10 (FIG. 2) includes a power switching module 160 which is connected between the d.c. motor 140 and microprocessor 122. Preferably, the switching module 160 includes four FET power switches arranged in an H-bridge circuit configuration for driving the d.c. motor 140 in either direction. In addition, the switching module 160 preferably includes conventional logic circuitry for interconnecting the FET bridge circuit to the d.c. motor 140 via two electrical leads, rather than four, and for interconnecting the FET bridge circuit to the microprocessor 140 via two electrical leads, 161A and 161B, rather than four, such that one of the leads, 161A or 161B, may be energized, and the other of the leads, 161B or 161A, deenergized, as the case may be, for driving the d.c. motor 140 in either direction. In addition, for controlling movement of the shutter bar 72, the base 12 includes cam shaft sensing structure 162, which is electrically connected the microprocessor 122. The structure 162 includes a cam-shaped disk 164, which is conventionally fixedly mounted on the cam shaft 148 for rotation therewith. The disk 164 (FIG. 3) includes an elongate, arcuately-shaped, lobe 166, having an arcuately-extending dimension $d_1$ which corresponds to a distance which is slightly less than, and thus substantially equal to, a predetermined linear distance $d_2$ (FIG. 2) through which the shutter bar key portion 74 is preferably moved for moving the shutter bar 72 out of locking engagement with the drum drive gear 66. Preferably however, rather than provide the disk 164, the rotary cam 150 is provided with a lobe portion 166A which is integrally formed therewith when the cam 150 and pulley 152 are injection molded as a single piecepart. And, the shaft position sensing structure 162 includes conventional lobe sensing structure 168 having a sensor 170 (FIG. 3) located in the path of travel of lobe, 166 or 166A as the case may be. As thus constructed and arranged, when the cam shaft 148 (FIG. 2) is rotated counter-clockwise, the lever arm 80 is pivoted thereby about the pin 156 to move the shutter bar 72 through the distance $d_2$ and out of locking engagement with the drum drive gear 66. Concurrently, the lobe, 166 or 166A (FIG. 3), is rotated counter-clockwise through the distance $d_2$, causing the leading edge 172 thereof, followed by the trailing edge 174 thereof, to be successively detected by the sensor 170, for providing first and second successive transition signals, such as the signal 175 (FIG. 2), to the microprocessor 122, initially indicating that movement of the shutter bar 72 has commenced and that the shutter bar 72 lobe 166 or 166A (FIG. 3) is blocking the sensor 170, followed by indicating that movement of the shutter bar 72 (FIG. 2) has been completed and that the sensor 170 (FIG. 3) is unblocked. Thereafter, when the cam shaft 148 (FIG. 2) is rotated clockwise, the lever arm 80 is pivoted thereby about the pin 156 to move the shutter bar 72 back through the distance $d_2$ and into locking engagement with the drum drive gear 66. And, concurrently, the lobe, 166 or 166A (FIG. 3), is rotated clockwise, through the distance $d_2$, causing the trailing edge 174 thereof, followed by the leading edge 172 thereof, to be successively detected by the sensor 170, for providing third and fourth successive transition signals 175 to the microprocessor 122 which again successively indicate that movement of the shutter bar 72 has commenced and that the sensor 170 (FIG. 3) is blocked, and that movement of the shutter bar 72 (FIG. 2) has been completed and that the sensor 170 (FIG. 3) is unblocked. In addition, for controlling movement of the shutter bar 72 (FIG. 2), the microprocessor 122 is preferably programmed, as hereinafter described in greater detail, to respond to receiving a sheet feeding signal 135 from the sensor 99A, and to receiving successive sets of transition signals 175 (FIG. 2) from the sensing structure 168, for timely causing the FET module 160 to drive the d.c. motor 140 to rotate the cam 150 counter-clockwise, for moving the shutter bar 72 through the distance $d_2$ and thus out of locking engagement with the drum drive gear 66 and until the second of the successive transition signals 175 is received, and, after a predetermined time interval during which the printing drum 64 is driven through a single revolution as hereinafter discussed, for causing the FET module 160 to then drive the d.c. motor 140 to rotate the cam 150 clockwise, for moving the shutter bar 72 back through the distance $d_2$ until the fourth of the successive transitions signals 175 is received to indicate that the shutter bar 72 has been moved into locking engagement with the drum drive gear 66.

As shown in FIG. 2, for driving the drum drive gear 66 and thus the drum 64, the mailing machine base 12 preferably includes a conventional d.c. motor 180, having an output shaft 182, and includes a drive system 184 for interconnecting the drum drive gear 66 to the motor shaft 182 when the postage meter 14 is mounted on the mailing machine base 12. The drive system 184 preferably includes a timing pulley 186 which is suitably fixedly connected to the motor output shaft 182 for rotation therewith. In addition, the drive system 184 includes an idler shaft 188, which is conventionally journaled to the framework 16 for rotation in place, and includes a timing pulley 190, which is conventionally fixedly connected to the idler shaft 188 for rotation thereof. Moreover, the drive system 184 includes a conventional timing belt 192, which is suitably looped about the pulleys, 190 and 186, for transmitting rotary motion of the motor drive shaft 182 to the idler shaft 188, and thus to the pulley 190. Preferably, the base 12 additionally includes a pinion gear 194, which is conventionally mounted on, or integrally formed with, the idler shaft 188 for rotation therewith. Further, the base 12 also includes an idler shaft 196, which is conventionally journaled to the framework 16 for rotation in place, and includes a drive system output gear 198. Preferably, the output gear 198 is suitably dimensioned relative to the drum drive gear 66 such that the gear ratio therebetween is one-to-one. And, the drive system output gear 198 is conventionally fixedly mounted on the idler shaft 196 for rotation thereof and is dimensioned so as to extend upwardly through an aperture 199 formed in the housing 18 to permit the drum drive gear 66 to be disposed in meshing engagement with the drive system output gear 198, when the postage meter 14 is mounted on the base 12, for driving thereby to rotate the printing drum 64 into and out of engagement with respective sheets 22 fed into the machine 10.

Figure 4:
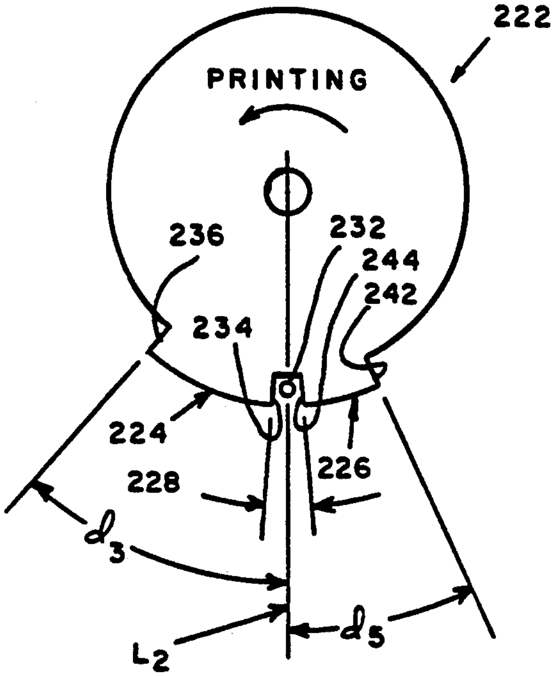
FIG. 4 is a schematic view of structure for sensing the angular position of the printing drum idler shaft of FIG. 2, and thus the location of the postage printing drum relative to its home position.

For controlling rotation of the drive system output gear 198 (FIG. 2), and thus rotation of the printing drum 64, the mailing machine base 12 includes the microprocessor 122, and includes power switching structure 200 connected between the d.c. motor 180 and the microprocessor 122. Preferably, the switching structure 200 includes a first FET power switch 202, nominally called a run switch, which is energizeable for driving the motor 180 in one direction, i.e., clockwise, and includes a second FET power switch 204, nominally called a brake switch, connected in shunt with the first FET power switch 202, which is energizeable for dynamically braking the motor 180. In addition, for controlling rotation of the printing drum 64, the base 12 includes a voltage comparing circuit 206, which is conventionally electrically interconnected between the microprocessor 122 and d.c. motor 180. Preferably, the voltage comparing circuit 206 includes a solid state comparator 208, having the output terminal thereof connected to the microprocessor 122. In addition, the comparator 208 has one of the input terminals thereof connected to the d.c. motor 180, for sampling the motor's back-e.m.f. voltage and providing a signal, such as the signal 210 to the comparator 208 which corresponds to the magnitude of the back-e.m.f. voltage. And, the comparator 208 has the other of the input terminals thereof connected to the microprocessor 122, via a suitable digital to analog converter 212 for providing the comparator 208 with an analog signal, such as the signal 214, which corresponds to a predetermined reference voltage. In addition, for controlling rotation of the printing drum 64, the base 12 includes idler shaft position sensing structure 220, which is electrically connected to the microprocessor 122. The structure 220 preferably includes a cam-shaped disk 222, which is conventionally fixedly mounted on the idler shaft 196 for rotation therewith and thus in step with counter-clockwise rotation of the drum 64, due to the one-to-one gear ratio between the drive system output gear 198 and drum drive gear 66. The disk 222 (FIG. 4) includes two, elongate, arcuately-shaped lobes, 224 and 226. The lobes 224 and 226 are preferably separated from one another by a two degree gap 228 which is bisected by a vertical line $L_2$ which extends through the axis of the disk 222 when the disk 222 is located in its home position, which home position corresponds to the home position of the drum drive gear slot 70 (FIG. 2) and thus to the home position of the printing drum 64. The lobe 224 (FIG. 4) has an arcuately-extending dimension $d_3$, which corresponds to a distance which is preferably slightly less than, and thus substantially equal to, the linear distance $d_4$ (FIG. 1) through which the outer periphery of the printing drum 64 is initially driven counter-clockwise from the home position thereof before being rotated into engagement with a sheet 22 fed into the machine 10. And, the lobe 226 (FIG. 4) has an arcuately-extending dimension $d_5$ which corresponds to a distance which is preferably slightly less than, and thus substantially equal to, the linear distance $d_6$ (FIG. 1) through which the outer periphery of the printing drum 64 is driven counter-clockwise upon being rotated out of engagement with a sheet 22 fed thereby through the machine 10. Further, the shaft position sensing structure 220 includes conventional lobe sensing structure 230 having a sensor 232 (FIG. 4) located in the path of travel of the lobes, 224 and 226. As thus constructed and arranged, assuming the shutter bar 72 (FIG. 2) is moved out of locking engagement with the drum drive gear 66, when the drive system output gear 198 commences driving the drum drive gear 66 and printing drum 64 from their respective home positions, the disk 222 (FIG. 4) is concurrently rotated counter-clockwise from its home position. As the lobe 224 is rotated through the distance $d_3$, causing the leading edge 234 of the lobe 224, followed by the trailing edge 236 thereof, to be successively detected by the sensor 232, successive first and second transition signals, such as the signal 240 (FIG. 2), are provided to the microprocessor 122, initially indicating that drum 64 (FIG. 2) has commenced rotation from the home position thereof, followed by indicating that the drum 64 has rotated 40° through the distance $d_4$. In addition, the transition signal 240 provided by the sensor 232 detecting the lobe's trailing edge 236 indicates that the drum 64 has rotated into feeding engagement with a sheet 22 fed into the machine 10. Thereafter, when the disk 222 and thus the drum 64 (FIG. 1) continue to rotate counter-clockwise, and the printing drum 64 prints indicia on the sheet 22 as the sheet 22 is fed thereby through the machine 10, until such rotation causes the leading edge 242 (FIG. 4) of the lobe 226, followed by the trailing edge 244 thereof, to be successively detected by the sensor 232. Whereupon the sensor 232 provides successive third and fourth transition signals 240 to the microprocessor 122, initially indicating that the drum 24 has rotated 335° and out of feeding engagement with the sheet 22, followed by indicating that the drum 64 has rotated through 359°, and thus substantially through the distance $d_6$ and back to the home position thereof. Still further, for controlling rotation of the printing drum 64, the microprocessor 122 is preferably programmed, as hereinafter described in greater detail, to timely respond to the completion of movement of the shutter bar 72 out of locking engagement with drum drive gear 66, to timely respond to the transition signals 240 from the idler shaft sensing structure 230 and to timely respond to receiving successive positive or negative comparison signals, such as the signal 248 from the comparator 208, to cause the FET switch 202 to drive the d.c. motor 180 for initially accelerating the drum 64 through an angle of 40°, followed by driving the drum 64 at a constant velocity through an angle of 295°, to drive each of the rollers 42, 44, 52 and 56 at the same peripheral, sheet feeding, speed. Moreover, the microprocessor 122 is preferably programmed to timely deenergize the FET run switch 202, and to energize the FET brake switch 204 to thereafter decelerate and dynamically brake rotation of the motor 180 to return the drum 64 through an angle of 25° to the home position thereof at the end of a single revolution of the drum 64.

In addition, for controlling operation of the base 12 (FIG. 1) and thus the machine 10, the base 12 preferably includes a conventional keyboard 250 which is suitably electrically connected to the microprocessor 122 by means of a serial communications link 252, including a data input lead 254, for providing signals, such as the signal 255, to the microprocessor 122, a data output lead 256, for providing signals, such as the signals 257 to the keyboard 250, and a clock lead 258 for providing clock signals to the keyboard 250 to synchronize communication between the keyboard 250 and microprocessor 122. The keyboard 250, which has a plurality of manually actuatable switching keys 260, preferably includes a print mode key 262, which is manually actuatable for causing the base 12 to enter into a sheet feeding and printing mode of operation, and a no-print mode key 264, which is manually actuatable for causing the base 12 to enter into a sheet feeding but no printing mode of operation. Further, for providing a visual indication to an operator concerning a trouble condition in the machine 10, the keyboard 260 preferably includes a service lamp 266 which is preferably intermittently energized in a light blinking mode of operation in response to signals 257 from the microprocessor 122 whenever the base 12 is in need of servicing, for example, due to the occurrence of a jam condition event in the course of operation thereof. Moreover, for controlling operation of the base 12, the base 12 preferably includes a manually actuatable test key 270, which is preferably disposed within the housing 18 of the base 12 for access and use by manufacturing and maintenance personnel. The test key 270 is conventionally electrically connected to the microprocessor 122 and is manually actuatable to provide a signal, such as the signal 272, to the microprocessor 122 for causing the base 12 to enter into one or more calibration modes of operation, wherein the sheet feeding and printing speeds of the base 12 and postage meter 14 are calibrated to ensure that the postage indicia printed on a given sheet 22 is acceptably located thereon. Further, for storing critical data utilized for operation of the base 12 in various modes thereof, including the calibration mode(s), the base 12 preferably includes a suitable non-volatile memory (NVM) 274 which is conventionally electrically connected to the microprocessor 122 and operable thereby for storing therein data without loss thereof due to power failure or during power-down conditions. And, to that end, the microprocessor 122 is preferably one of the type which includes an electrically erasible, programmable, read only, memory (EEPROM).

Figure 6A:
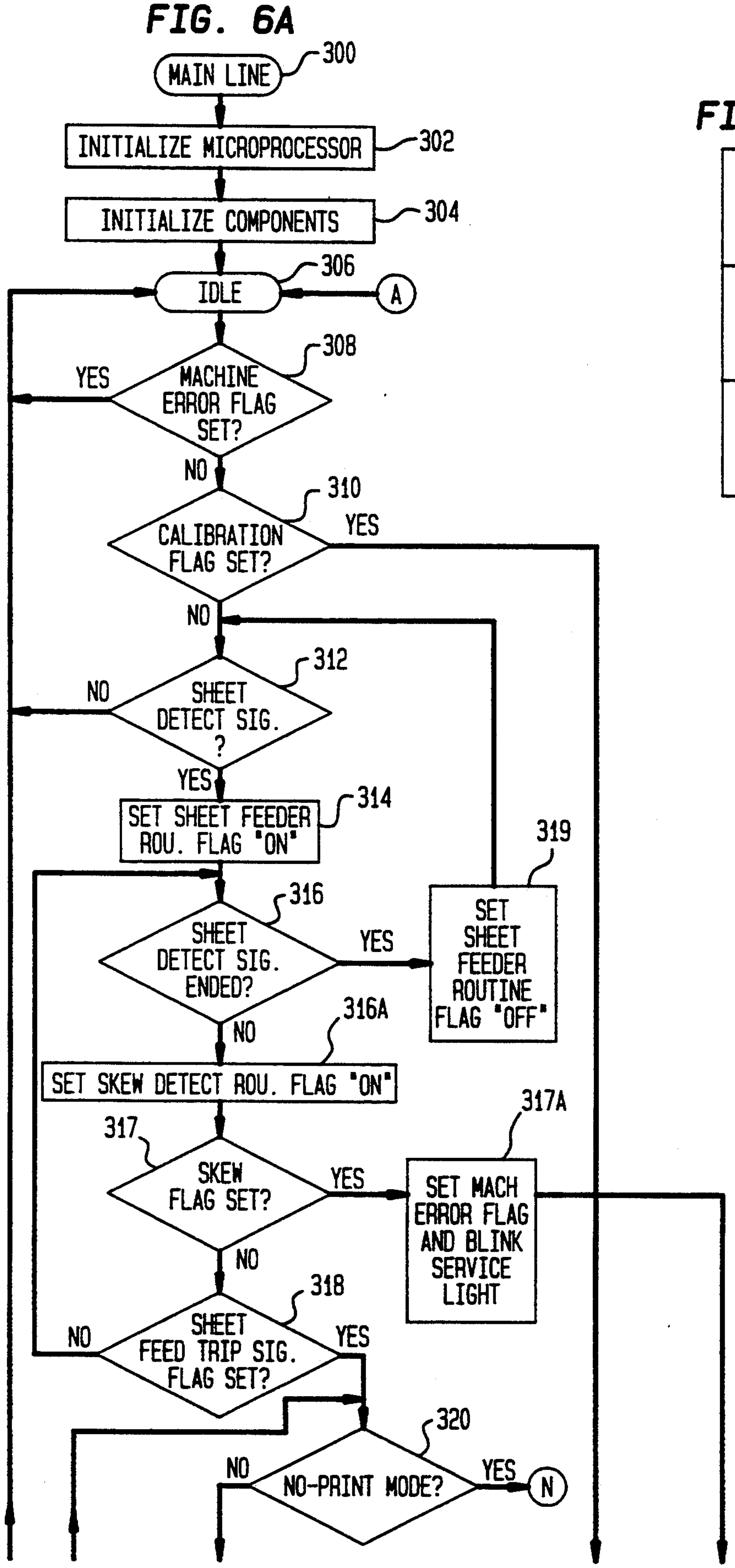
FIG. 6 is a diagram showing the relationship of FIGS. 6A, 6B and 6C which are a flow chart of the main line program of the microprocessor of the mailing machine base of FIG. 1, showing the supervisory process steps implemented in the course of controlling sheet feeding, and shutter bar and postage printing drum motion.
Figure 6:
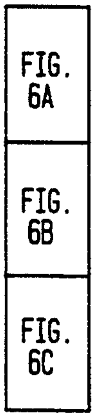
Figure 6B:
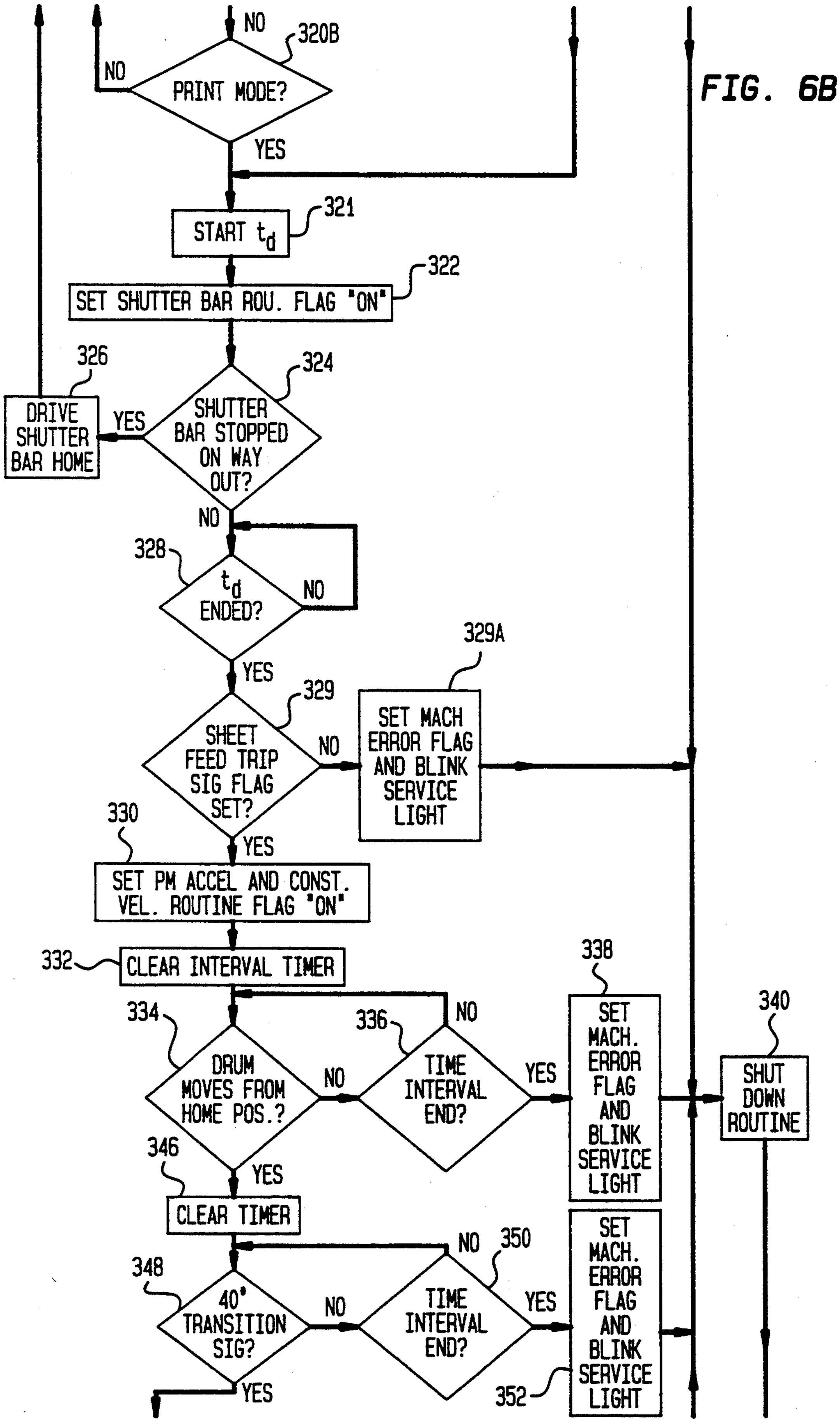
Figure 6C:
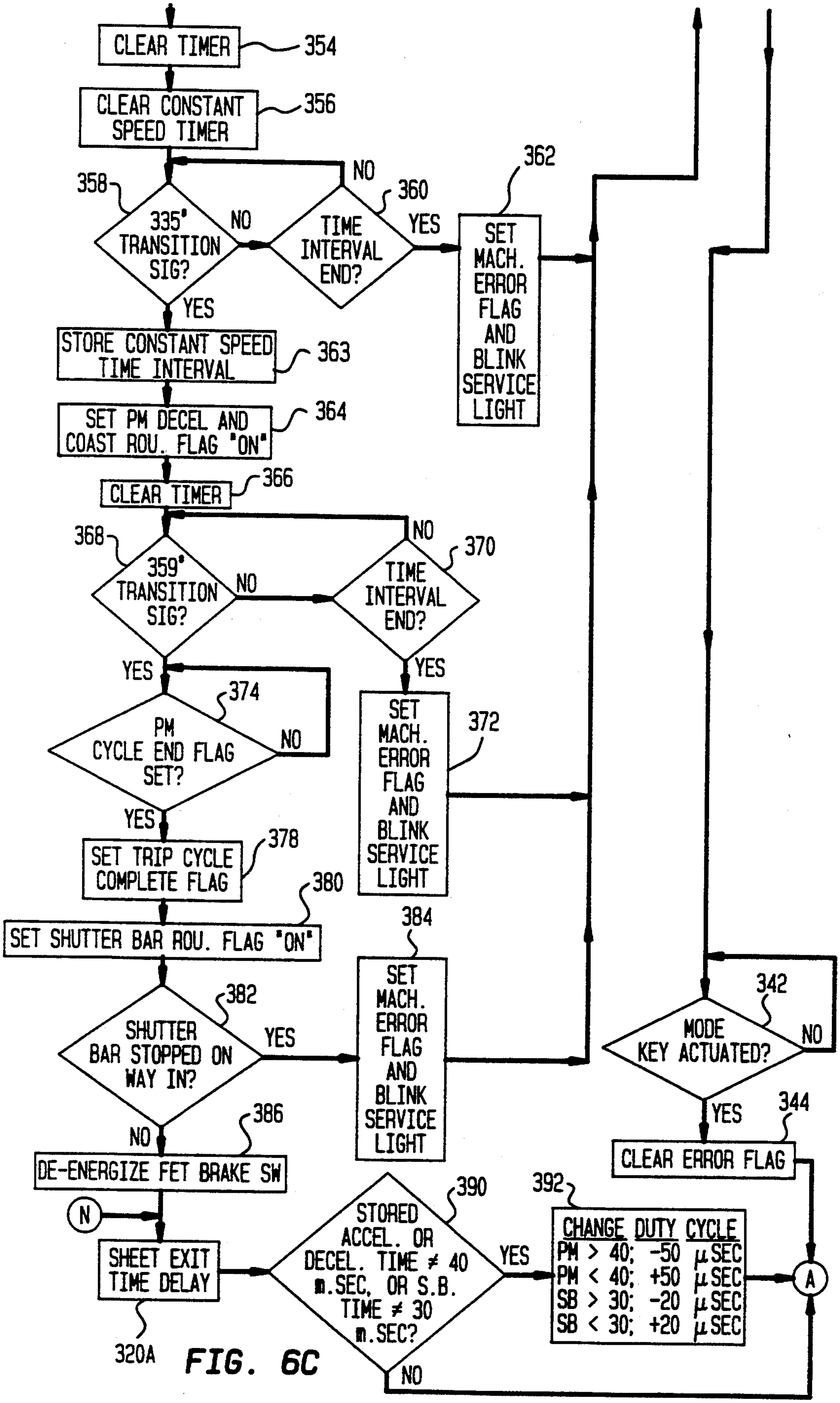

As shown in FIGS. 6A, 6B and 6C as combined as shown in FIG. , in accordance with the invention the microprocessor 122 is preferably programmed to include a main line program 300, which commences with the step 302 of conventionally initializing the microprocessor 122 (FIGS. 1 and 2) in response to the operator manually moving the power switch 132 to the "on" position thereof to energize the d.c. power supply 120 and thus the mailing machine base 12. Step 302 generally includes establishing the initial voltage levels at the microprocessor interface ports which are utilized for sending and receiving the signals 275, 272, 134, 176, 175, 240, 136 and 248 to and from the keyboard, test key, sensors and comparators 250, 270, 97A, 99A, 170, 232, 125 and 248, (FIG. 1, 2, 3 and 4) for controlling the various structures of the mailing machine base 12, and setting the interval timers and event counters of the microprocessor 122. Thereafter, the microprocessor 122 executes the step 304 (FIG. 6A) of initializing the components of the aforesaid various structures. Step 304 generally entails causing the microprocessor 122 (FIGS. 1, 3 and 4) to scan the microprocessor ports connected to the various sensors, 97A, 99A, 170 and 232, and, if necessary, to cause the main line program to enter into a print mode of operation and drive the motors 110, 140 and 180 for causing various components of the base 12 and meter 14, including the drum drive gear 66, and thus the printing drum 64, to be driven to their respective home positions from which operation thereof, and thus of the mailing machine 10 may be initiated.

Assuming completion of the initialization steps 302 and 304 (FIG. 6A), then, according to the invention, the program 300 enters into an idle loop routine 306 which commences with the step 308 of determining whether or not a a machine error flag has been set, due to the occurrence of various events, hereinafter discussed in greater detail, including, for example, the sheet feeding structures 40, 50 or 55 (FIG. 1) being jammed in the course of feeding a sheet 22 through the machine 10, the shutter bar 72 (FIG. 2) not being fully moved through the distance $d_2$ in the course of movement thereof either out of or into locking engagement with the drive gear 66, or the meter drive system 184 being jammed in the course of driving the same. Assuming a machine error flag has been set, step 308 (FIG. 6A), the program 300 returns processing to idle 306, until the condition causing the error flag to be set is cured and the error flag is cleared, and a determination is thereafter made that an error flag has not been set, step 308. Whereupon, the microprocessor 122 causes the program 300 to implement the step 310 of determining whether or not the sheet feeding or printing speed calibration flag has been set, due to the test key 270 (FIG. 1) having been actuated as hereinafter discussed. Assuming the calibration flag has not been set, step 310 (FIG. 6A), the program 300 implements the step 312 of determining whether or not a sheet detection signal 134 (FIG. 1) has been received from the sensor 97A of the sheet detection structure 97, and, assuming that it has not been received, step 312 (FIG. 6A), the program 300 loops to idle, step 306, and continuously successively implements steps 308, 312, and 306 until the sheet detection signal 134 is received. Whereupon, the program 300 implements the step 314 of setting the sheet feeder routine flag "on", which results in the routine 300 calling up and implementing the sheet feeder routine 400 (FIG. 7), hereinafter discussed in detail.

As the routine 400 (FIG. 7) is being implemented, the program 300 (FIG. 6A) concurrently implements the step 316 of determining whether or not the sheet detection signal 134 has ended, followed by the step 316A of setting the skew detection routine flag "on", which results in calling up and implementing the sheet skew detection routine 1000 (FIG. 18) hereinafter described in detail. As the skew detection routine 1000 is being implemented, the program 300 (FIG. 6A) concurrently implements the step 317 of determining whether a skew flag has been set, as hereinafter discussed in detail, indicating that the sheet 22 (FIG. 1) being fed into the machine 10 is askew relative to the direction of the path of travel 38 defined by the registration fence 95. Assuming, however as is the normal case that the skew flag is not set, step 317, then, the program 300 (FIG. 6A) implements the step 318 of determining whether the sheet feeding trip signal flag has been set, indicating that a sheet feeding trip signal 135 (FIG. 1) has been received from the sensor 99A of the sheet feeding trip structure 99. Assuming that it is determined that the sheet detection signal 134 has not ended, step 316 (FIG. 6A) and, in addition, it is determined that the sheet feeding trip signal flag has not been set, step 318 indicating that the microprocessor 122 has not received the sheet feeding trip signal, then, the program 300 returns processing to step 316 and continuously successively implements steps 316, 317 and 318 until the sheet feeding trip signal 135 is received, step 318, before the sheet detection signal 134 is ended, step 316. If, in the course of such processing, the sheet detection signal ends, step 316, before the sheet feeding trip signal is received, step 318, then, the program 300 implements the step 319, of setting the sheet feeder routine flag "off" followed by returning processing to step 312. Thus the program 300 makes a determination as to whether or not both sensors 97A and 99A (FIG. 1) are concurrently blocked by a sheet 22 fed to the machine 10 and, if they are not, causes sheet feeding to be ended. As a result, if an operator has fed a sheet 22 to the mailing machine base 12 and it is sensed by the sensor 97A, but is withdrawn before it is sensed by the sensor 99A, although the sheet feeding routine 400 (FIG. 7) has been called up and started, step 314 (FIG. 6A), it will be turned off, step 319, until successive implementations of step 312 result in a determination that another sheet detection signal, step 312, has been received and the program 300 again implements the step 314 of setting the sheet feeder routine flag "on". Assuming however, that both the sheet detection and feeding signals, 134 and 135, are received, steps 316 and 318, before the sheet detection signal 134 is ended, step 316, then, the program 300 implements the step 320 of determining whether the base 12 is in the no-print mode of operation, as a result of the operator having actuated the no-print key 264 (FIG. 1). Assuming that the no-print key 264 has been actuated, step 320 (FIG. 6A), due to the operator having chosen to use the base 12 (FIG. 1) for sheet feeding purposes and not for the purpose of operating the postage meter 14, then, the program 300 (FIGS. 6A and 6C) by-passes the drum driving steps thereof and implements the step 320A of causing program processing to be delayed for a time interval sufficient to permit the sheet 12 being fed by the base 12 to exit the machine 10. Assuming however, that the base 12 is not in the no-print mode of operation, step 320, then the program 300 implements the step 320B of determining whether the base 12 (FIG. 1) is in the print mode of operation, as a result of the operator having actuated the print key 262. Assuming, the inquiry of step 320B (FIG. 6B) is negative, due to the operator not having chosen to use the base 12 for both sheet feeding and postage printing purposes, then, the program 300 returns processing to step 320 and continuously successively implements steps 320 and 320B until the operator actuates either the print or no-print key, 262 or 264 (FIG. 1) to cause the inquiry of one or the other of steps 320 or 320B (FIGS. 6A and 6B) to be affirmatively determined. Assuming that the print key 262 is actuated, causing the inquiry of step 320B to be affirmative, then the program 300 implements the step 321 of starting a time interval counter for counting a predetermined time interval $t_d$ (FIG. 5), of substantially 80 milliseconds, from the time instant that a sheet 22 (FIG. 1) is detected by the sensing structure 99 to the predetermined time instant that the printing drum 64 preferably commences acceleration from its home position in order to rotate into engagement with the leading edge 100 of the sheet 22 as the sheet 22 is fed therebeneath.

Thereafter, the program 300 (FIG. 6B) implements the step 322 of setting the shutter bar routine flag "on", which results in the program 300 calling up and implementing the shutter bar routine 500 (FIG. 8), hereinafter discussed in detail, for driving the shutter bar 72 (FIG. 2) through the distance $d_2$ and thus out of locking engagement with the drum drive gear 66. As the routine 500 (FIG. 8) is being implemented, the program 300 (FIG. 6B) concurrently implements the step 324 of determining whether or not the shutter bar 72 (FIG. 2) has stopped in the course of being driven through the distance $d_2$ and thus out of locking engagement with the drum drive gear 66. Assuming that the shutter bar 72 is stopped, then, the program 300 (FIG. 6B) implements the step 326 of causing the shutter bar 72 (FIG. 2) to be driven back into locking engagement with the drum drive gear 66, step 326 (FIG. 6B), followed by returning processing to idle, step 306. If however, the shutter bar 72 (FIG. 2) is not stopped in the course of being driven through the distance $d_2$, and thus out of locking engagement with the drum drive gear 66, then, the program 300 (FIG. 6B) implements the step 328 of determining whether or not the time interval count, started in step 321, has ended. And, assuming that it has not, the program 300 continuously loops through step 328 until the time interval $t_d$ is ended. Thereafter, before the program 300 implements the step 330 of setting the postage meter routine flag "on", which results in the program 300 calling up and implementing the postage meter acceleration and constant velocity, or postage printing, routine 600 (FIG. 9). The program 300 preferably implements the step 329 (hereinafter discussed in greater detail) of determining whether the sheet feeding trip signal flag found to be set in step 318 is still set, to determine whether the sheet 22 disposed in blocking relationship with the sensor 99A is still disposed in blocking relationship therewith after the time delay interval $t_d$ of 80 milliseconds, and thus to determine whether the sheet 22 is of sufficient length for printing purposes. Assuming, at this juncture, as is the normal case that the inquiry of step 329 is affirmative, indicating that the sheet 22 is of sufficient length, then, the program 300 implements the step 330 of setting the postage meter acceleration and constant velocity routine flag "on", which results in the program 300 calling up and implementing the postage meter acceleration and constant velocity, or postage printing, routine 600 (FIG. 9).

As the routine 600 (FIG. 9) is being implemented, the program 300 (FIG. 6B) concurrently implements the step 332 of clearing a time interval counter for counting a first predetermined fault time interval, of preferably 100 milliseconds, during which the microprocessor 122 (FIG. 2) preferably receives the initial transition signal 240 from the sensing structure 220, due to the printing lobe's leading edge 234 (FIG. 4) being sensed by the sensor 232, indicating that the postage printing drum 64 (FIG. 2) has commenced being driven from its home position by the drum drive gear 66. Accordingly, after clearing the time interval counter, step 332 (FIG. 6B), the program 300 implements the step 334 of determining whether or not the printing drum 64 has commenced movement from its home position. And, assuming that it has not, the program 300 continuously successively implements the successive steps of determining whether or not the first fault time interval has ended, step 336, followed by determining whether or not the drum 64 has moved from its home position, step 334, until either the drum 64 has commenced moving before the first fault time interval ends, or the first fault time interval ends before the drum has commenced moving. Assuming the first fault time interval ends before the drum has moved, then, the program 300 implements the step 338 of setting a machine error flag and causing the keyboard service lamp 266 to commence blinking, followed by the step 340 of causing a conventional shut-down routine to be implemented. Accordingly, if the postage printing drum 64 is not timely driven from its home position at the end of the time delay interval $t_d$ (FIG. 5) of substantially 80 milliseconds, and after commencement of implementation of the postage meter acceleration and constant velocity routine, step 330 (FIG. 6B), the program 300 causes processing to be shut down, and a blinking light 266 (FIG. 1) to be energized to provide a visual indication to the operator that the mailing machine base 12 or postage meter 14, or both, are in need of servicing. At this juncture, the operator of the machine 10 may find, for example, that the drum 64 did not move from its home position due to the postage meter 14 having insufficient funds to print the postage value entered therein by the operator for printing purposes, or some other error condition has occurred in the meter 14 which preludes driving the drum 64 from its home position. Alternatively, the operator may find that a jam condition exists in the base 12 which prevents the drum drive gear 66 from driving the drum 64. Whatever may be the reason for the drum 64 not being timely moved from its home position during the time interval, the operator would normally cure the defect, or call an appropriate service person to do so, before the machine 10 is returned to normal operation. Accordingly, as shown in FIGS. 6B and 6C, after implementation of the shut-down routine, step 340, the program 300 implements the step 342 of making a determination as to whether or not either of the print or no-print mode keys, 260 or 262, (FIG. 1) is actuated. And, assuming that a mode key, 260 or 262, has not been actuated, which determination would normally indicate that the trouble condition which resulted in implementation of the shut down routine, step 340 (FIG. 6B) had not as yet been cured, then the program 300 causes processing to continuously loop through step 342 until one of mode keys, 260 or 262, is actuated. Whereupon the program 300 implements the step 344 of causing the error flag to be cleared, followed by returning processing to idle, step 306.

Figure 5:
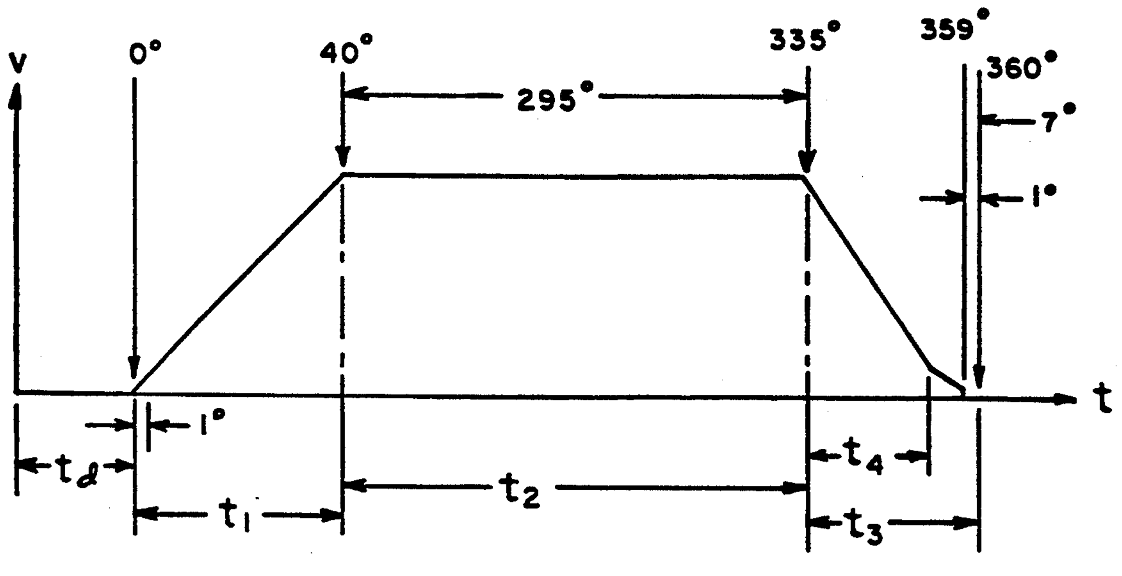
FIG. 5 is a schematic view of the substantially trapezoidal-shaped velocity versus time profile of desired rotary motion of the postage printing drum of FIG. 1.

Referring back to step 334 (FIG. 6B), and assuming as is the normal case that the postage printing drum 64 is timely moved from its home position, i.e., before the first predetermined fault time interval is ended, step 336 (FIG. 6B), then, the program 300 causes the time interval counter to be cleared, step 346, and to commence counting a second predetermined fault time interval, of preferably 100 milliseconds, during which the microprocessor 122 (FIG. 2) preferably receives the next transition signal 240 from the sensing structure 220, due to the printing lobe's trailing edge 236 (FIG. 4) being sensed by the sensor 232, indicating that the postage printing drum 64 (FIG. 2) has rotated through the initial 40° of rotation thereof from its home position (FIG. 5). Accordingly, after clearing the time interval counter, step 346 (FIG. 6B), the program 300 implements the step 348 of determining whether or not the 40° transition signal 240 has been received. And, assuming that it has not, the program 300 continuously successively implements the successive steps of determining whether or not the second fault time interval has ended, step 350, followed by determining whether or not the 40° transition signal 240 has been received, step 348, until either the 40° transition signal 240 is received before the second fault time interval ends, or the second fault time interval ends before the 40° transition signal 240 is received. Assuming that the second fault time interval ends before the 40° transition signal 240 is received, then, the program 300 implements the step 352, corresponding to step 338, of setting a machine error flag and causing the keyboard service lamp 266 to commence blinking, followed by implementing the successive machine shut-down and start-up steps 340, 342 and 344, hereinbefore discussed in detail, and returning processing to idle, step 306.

Figure 10:
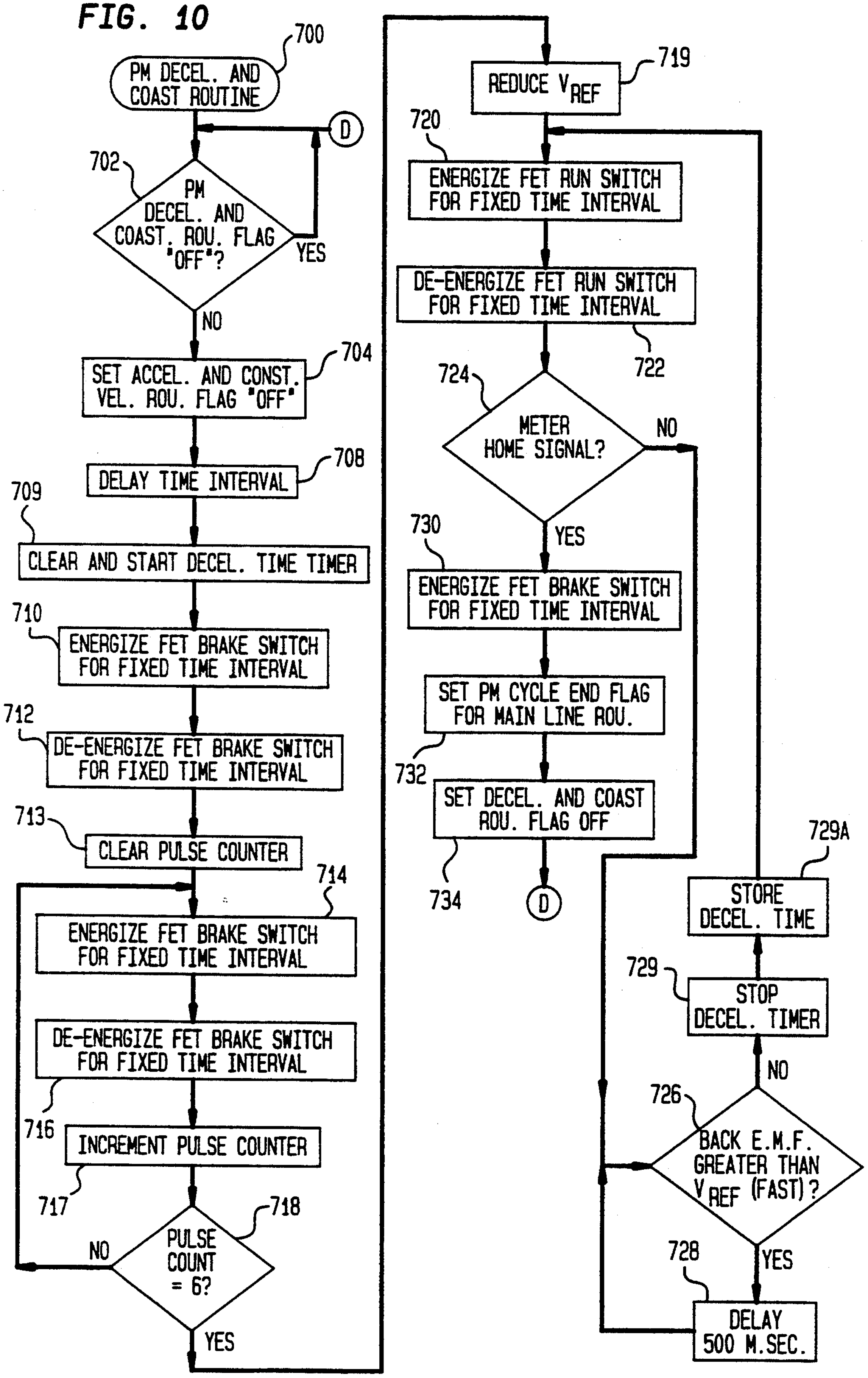
FIG. 10 is a flow chart of the postage printing drum deceleration and coasting routine of the microprocessor of FIG. 1, showing the process steps implemented for controlling the rate of deceleration of the postage printing drum, from the substantially constant sheet feeding and printing speed, to rest in its home position.

On the other hand, assuming as is the normal case that a determination is made in step 348 (FIG. 6B) that the 40° transition signal was timely received, i.e., at the end of the time interval $t_1$ (FIG. 5) of preferably 40 milliseconds, and thus before the second predetermined fault time interval is ended, step 350 (FIG. 6B), then, the program 300 causes the time interval counter to be cleared and to commence counting a third predetermined fault time interval, of preferably 500 milliseconds, during which the microprocessor 122 (FIG. 2) preferably receives the next transition signal 240 from the sensing structure 220, due to the printing lobe's leading edge 242 (FIG. 4) being sensed by sensor 232, indicating that the postage printing drum 64 (FIG. 2) has rotated through 335° of rotation thereof from its home position. Thereafter, the program 300 implements the successive steps of clearing a second time interval counter, step 356, for counting the duration of actual constant speed of rotation of the postage printing drum 64, followed by the step 358 of making a determination as to whether or not the 335° transition signal 240 has been received. Assuming that the 335° transition signal 240 is not received, step 358, the program 300 continuously successively implements the successive steps of determining whether or not the third fault time interval has ended, step 360, followed by determining whether or not the 335° transition signal 240 has been received, step 358, until either the 335° transition signal 240 is received before the third fault time interval ends, or the third fault time interval ends before the 335° transition signal 240 is received. Assuming the third fault time interval ends before the 335° transition signal 240 is received, then, the program 300 implements the step 362, corresponding to step 338, of setting a machine error flag and causing the keyboard service lamp 266 to commence blinking, followed by implementing the successive machines shut-down and start-up steps 340, 342 and 344, as hereinbefore discussed in detail, and returning processing to idle, step 306. However, assuming as is the normal case that a determination is made in step 358 that the 335° transition signal 240 was timely received, i.e., at the end of the time interval $t_2$ (FIG. 5) of preferably 292 milliseconds, and thus before the third predetermined fault time interval is ended, step 360, then, the program 300 implements the step 363 of storing the actual time interval of duration of constant speed rotation of the postage printing drum 64, followed by the step 364 of setting the postage meter deceleration and coasting routine flag "on", which results in the program 300 calling up and implementing the postage meter deceleration and coasting routine 700 (FIG. 10).

As the routine 700 (FIG. 10) is being implemented, the program 300 (FIG. 6C) concurrently implements the step 366 of clearing the time interval counter for counting a fourth predetermined fault time interval, of preferably 100 milliseconds, during which the microprocessor 122 (FIG. 2) preferably receives the last transition signal 240 from the sensing structure 220, due to the printing lobe's trailing edge 244 (FIG. 4) being sensed by the sensor 232, indicating that the postage printing drum 64 (FIG. 2) has rotated through 359° of rotation thereof from its home position and is thus one degree from returning thereto. Thereafter, the program 300 implements the step 368 of making a determination as to whether or not the 359° transition signal 240 has been received. Assuming that it has not, the program 300 continuously successively implements the successive steps of determining whether or not the fourth fault time interval has ended, step 370, followed by determining whether or not the 359° transition signal 240 has been received, step 368, until either the 359° transition signal 240 is received before the fourth fault time interval ends, or the fourth fault time interval ends before the 359° transition signal 240 is received. Assuming the fourth fault time interval ends before the 359° transition signal 240 is received, then, the program 300 implements the step 372, corresponding to step 338, of setting a machine error flag and causing the keyboard service lamp 266 to commence blinking, followed by implementing the successive machine shut-down and start-up steps 340, 342 and 344, as hereinbefore discussed in detail, and returning processing to idle, step 306. However, assuming as is the normal case that a determination is made in step 368 that the 359° transition signal 240 was timely received, i.e., substantially at the end of the time interval $t_3$ of preferably 40 milliseconds, and thus before the fourth predetermined fault time interval is ended, step 370, then, the program 300 implements the step 374 of determining whether or not the postage meter cycle ended flag has been set, i.e., whether or not the postage meter deceleration and coasting routine 700 (FIG. 10) has been fully implemented. Assuming that the postage meter cycle ended flag has not been set, step 374, then, the program 300 (FIG. 6C) continuously implements step 374 until the postage meter cycle ended flag has been set. Whereupon, the program 300 implements the step 378 of setting a postage meter trip cycle complete flag.

Thereafter, the program 300 (FIG. 6C) implements the step 380 of setting the shutter bar routine flag "on", which results in the program 300 calling up and implementing the shutter bar routine 500 (FIG. 8), as hereinafter discussed in detail, for driving the shutter bar 72 (FIG. 2) back through the distance $d_2$ and into locking engagement with the drum drive gear 66. As the routine 500 is being implemented, the program 300 concurrently implements the step 382 of determining whether or not the shutter bar 12 (FIG. 2) has stopped in the course of being driven through the distance $d_2$ and thus into locking engagement with the drum drive gear 66. Assuming the shutter bar 72 is stopped, then, the program 300 (FIG. 6C) implements the step 384 of setting the machine error flag and causing the keyboard service lamp 266 to commence blinking, followed by implementing the successive machine shut-down and start-up steps 340, 342 and 344, hereinbefore discussed in detail, and returning processing idle, step 306. If however, as is the normal case, a determination is made that the shutter bar 72 has not stopped, then, the program 300 implements the step 386 of deenergizing the FET brake switch 204 (FIG. 2), to remove the shunt from across the postage meter drive system's d.c. motor 180. Thereafter, the program 300 implements the step 320A of causing processing to be delayed for a predetermined time interval, of preferably 500 milliseconds, to permit the sheet 22 being processed by the machine 10 to exit the base 12, followed by the successive steps 390 and 392, hereinafter discussed in detail, of initially determining whether the stored, actual time intervals of acceleration and deceleration of the postage printing drum 64 (FIG. 2), and the actual movement time interval of the shutter bar 72 in either direction, is not equal to the design criteria therefor, followed by incrementally changing the actual time intervals, as needed, to cause the same to respectively be equal to their design criteria value. Thereafter, the program 300 returns processing to idle, step 306.

Figure 7:
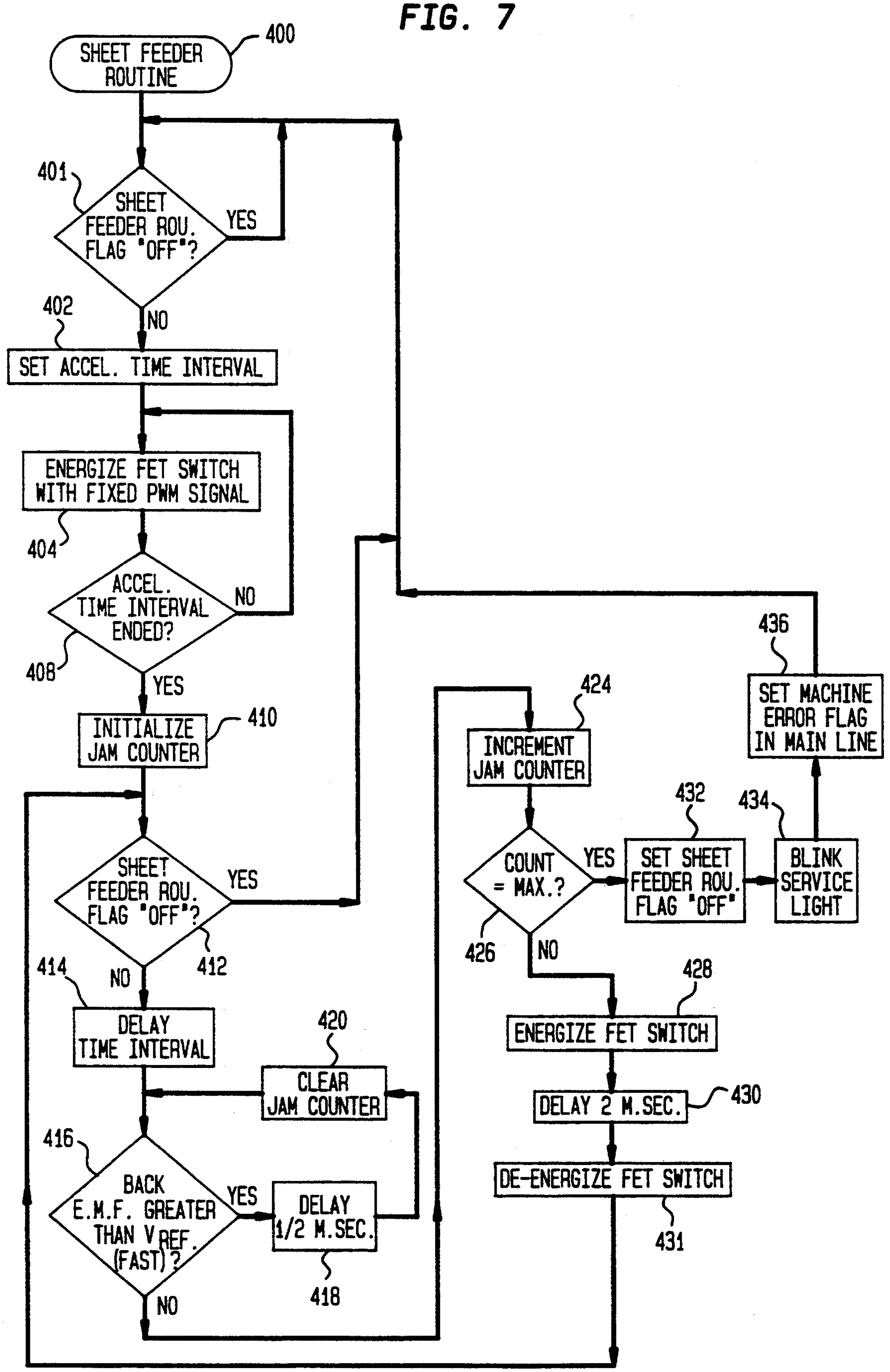
FIG. 7 is a flow chart of the sheet feeder routine of the microprocessor of FIG. 1, showing the process steps implemented for accelerating the sheet feeding rollers to a constant feeding speed, and thereafter maintaining the speed constant.

As shown in FIG. 7, according to the invention, the sheet feeding routine 400 commences with the step 401 of determining whether or not the sheet feeder routine flag setting is "off" due to an error event occurring, such as one of the sheet feeder jam conditions hereinbefore discussed, in the course of operation of the mailing machine base 12. Assuming that the sheet feeder routine flag setting is "off", step 401, the routine 400 continuously loops through step 401 until the sheet feeder routine "off" flag has been cleared, i.e., reset to "on", for example, due to the jam condition having been cured. However, assuming that the sheet feeder routine flag setting is "on" then, the routine 400 implements the step 402 of clearing a time interval timer and setting the same for counting a first predetermined time interval, of preferably 30 milliseconds, during which the d.c. motor 110 (FIG. 1) is preferably energized for slowly accelerating the sheet feeding rollers, 44, 50 and 55, at a substantially constant rate during the predetermined time interval to a sheet feeding speed of twenty six inches per second for feeding one sheet 22 each 480 milliseconds. Thus the routine 400 (FIG. 7) causes the microprocessor 122 to implement the step 404 of energizing and deenergizing the FET power switch 120 (FIG. 1) with a fixed, pulse-width-modulated, signal, such as the signal 405, which preferably includes 10 positive duty cycle energization pulses of one millisecond each in duration, separated by 10 deenergization time intervals of two milliseconds each in duration, so as to provide one energization pulse during each successive three millisecond time interval for 10 successive time intervals, or a total of 30 milliseconds. The energization pulses are successively amplified by the FET switch 120 (FIG. 1) and applied thereby to the d.c. motor 110 for driving the rollers 44, 52 and 56, via the belt and pulley system 114. Thereafter, the routine 400 (FIG. 7) implements the step 408 of determining whether or not the acceleration time interval has ended. Assuming the acceleration interval has not ended, step 408, the routine 400 loops to step 404 and successively implements steps 404 and 408 until the acceleration time interval is ended, step 408. In this connection it is noted that the preferred acceleration time interval of 30 milliseconds is not critical to timely accelerating the sheet feeding rollers 44, 52 and 56 (FIG. 1) to the desired sheet feeding speed of 26 inches per second, since the time interval required for a given sheet 22 to be detected by the sensor 97A to the time instant it is fed to the nip of the upper and lower input feed rollers, 42 and 44, is much greater than 30 milliseconds. Assuming the time interval has ended, step 408, the routine 400 then implements the step 410 of initializing an event counter for counting a maximum predetermined number of times the counter will be permitted to be incremented, as hereinafter discussed, before it is concluded that a jam condition exists in the sheet feeding structure. Thereafter, the routine 400 causes the microprocessor 122 to implement the step 412 of determining whether or not the sheet feeder routine flag setting is "off", due to an error event occurring, such as one of the jam conditions hereinbefore discussed, in the course of operation of the mailing machine base 12. Assuming that the sheet feeder routine flag setting is "off", step 412, the routine 400 returns processing the step 401. Whereupon, the routine 400 continuously loops through step 401, as hereinbefore discussed, until the flag is reset to "on". Assuming, however that the sheet feeder routine flag setting is "on", step 412, for example due to the jam condition having been cleared, then, the routine 400 implements the step 414 of delaying routine processing for a predetermined time interval, such as two milliseconds, to allow for any transient back e.m.f. voltage discontinuities occurring incident to deenergization of the d.c. motor 110 to be damped. Thereafter, the routine 400 causes the microprocessor 122 (FIG. 1) to sample the output signal 136 from the comparator 125 to determine whether or not the d.c. motor back e.m.f. voltage signal 126 is greater than the reference voltage signal 127, step 416 (FIG. 7).

Assume as in normal case that the back e.m.f. voltage is greater the reference voltage, step 416 (FIG. 7), due to the rollers 42, 44, 52 and 56 having been accelerated to a sheet feeding speed which is slightly greater than the desired sheet feeding speed of 26 inches per second, because the rollers 42, 44, 52 and 56 are not then under a load. At this juncture the sheet feeding speed is substantially equal to the desired sheet feeding speed, and, in order to maintain the desired sheet feeding speed, the routine 400 implements the successive steps of delaying processing one-half a millisecond, followed by the step 420 of clearing the jam counter, i.e., resetting the count to zero, and again implementing the step 416 of determining whether or not the motor back e.m.f. voltage is greater than the reference voltage. Assuming that the inquiry of step 416 remains affirmative, the routine 400 repeatedly implements steps 418, 420 and 416 until the back e.m.f. voltage is not greater than the reference voltage, at which juncture it may be concluded that the sheet feeding speed of the rollers 42, 44, 52 and 56 is no longer substantially at the desired sheet feeding speed. Accordingly, the routine 400 then implements the step 424 of incrementing the jam counter by a single count, followed by the step 426 of determining whether or not the number of times the jam counter has been incremented is equal to a predetermined maximum count of, for example, 100 counts. And, assuming that the maximum count has not been reached, step 426, the microprocessor 122 causes the FET power switch 120 to be energized, step 428, for applying a d.c. voltage, such as the power supply voltage 134, to the motor 110, followed by delaying processing for a fixed time interval, step 430, of preferably two milliseconds, and then deenergizing the FET switch 431, step 431, whereby the FET power switch 120 is energized for a predetermined time interval of preferably two milliseconds. Thereafter, processing is returned to step 412. Accordingly, each time the routine 400 successively implements steps 414, 416, 424, 426, 428, 430 and 431, the FET switch 120 and thus the d.c. motor 110, is energized for a fixed time interval, steps 428, 430 and 431, and the jam counter is incremented, step 424, unless there is a determination made in step 416 that the d.c. motor back e.m.f. voltage is greater than the reference voltage, i.e., that the d.c. motor 110 is being driven substantially at the constant sheet feeding speed.

Referring back to step 416 (FIG. 7), and assuming that the comparison initially indicates that the back e.m.f. is not greater than the reference voltage, indicating that the sheet feeding rollers 42, 44, 52 and 56 were not accelerated substantially to the desired sheet feeding speed of 26 inches per second in the course of implementation of steps 402, 404, and 408, then, the routine 400 continuously successively implements step 424, 426, 428, 430, 431, 412, 414 and 416 until, as hereinbefore discussed the back e.m.f. voltage exceeds the reference voltage, step 416, before the jam count maximizes, step 426, or the jam count maximizes, step 426, before the back e.m.f. voltage exceeds the reference voltage.

Since each of such jam counts, step 426 (FIG. 7), is due to a determination having been made that the d.c. motor back e.m.f. voltage is not greater than the reference voltage, step 416, it may be concluded that there is no d.c. motor back e.m.f. voltage when the jam count reaches the maximum count, step 426. That is, it may be concluded that the d.c. motor 110 is stalled due to a sheet feeding jam condition occurring in the mailing machine 10. Accordingly, if the jam count has reached the maximum count, the routine 400 implements the successive steps of setting the sheet feeder flag "off", step 432, causing the keyboard service lamp 266 to commence blinking, step 434, and then setting a machine error flag, step 436, for the main line program 300 (FIG. 6). Thereafter, the routine (FIG. 7) 400 returns processing to step 401. Whereupon, assuming that the motor jam condition is not cleared, the routine 400 will continuously loop through step 401 until the jam condition is cured and the "off" flag setting is cleared.

Figure 8:
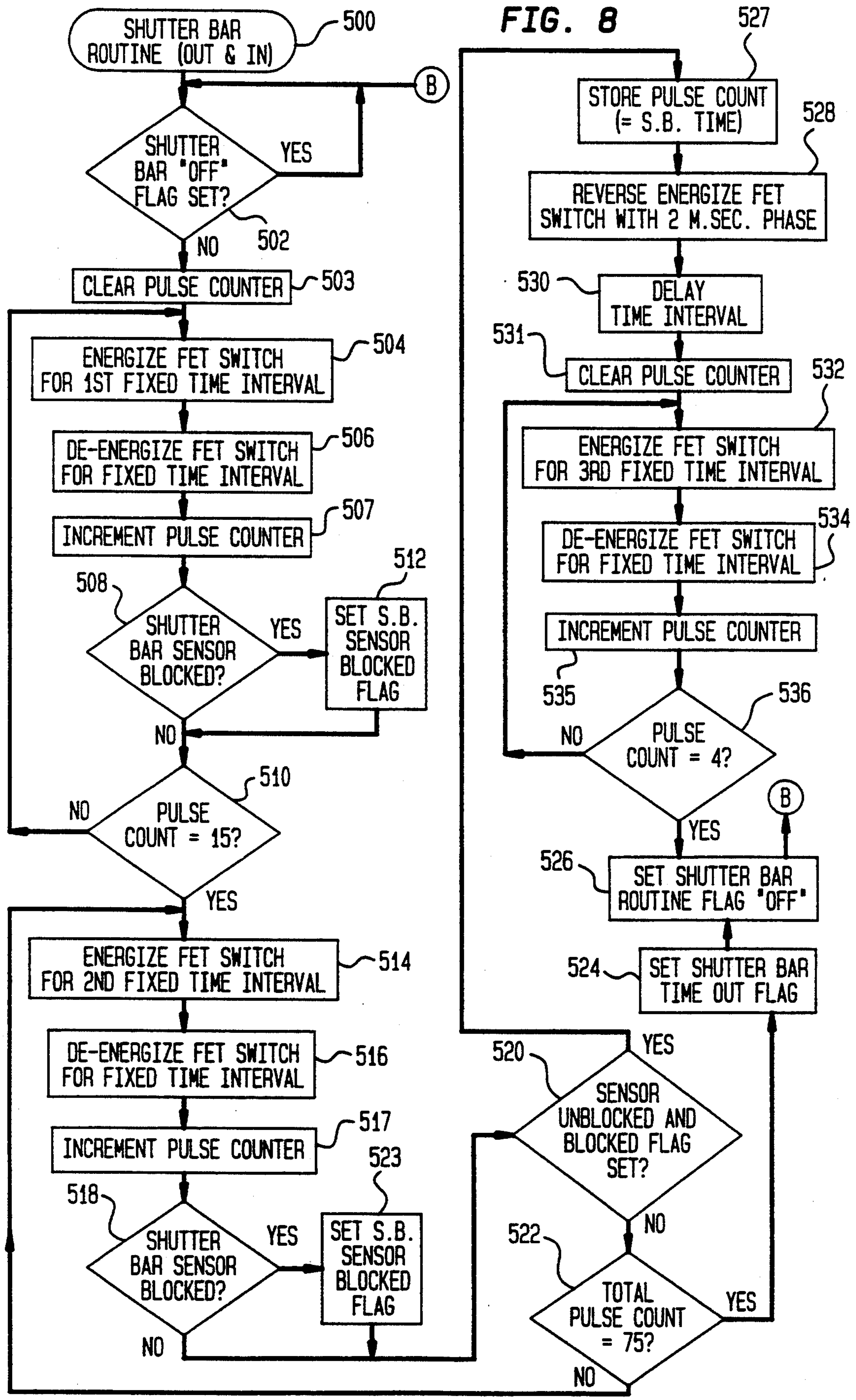
FIG. 8 is a flow chart of the shutter bar routine of the microprocessor of FIG. 1, showing the process steps implemented for controlling shutter bar movement out of and into locking engagement with the postage printing drum drive gear.
Figure 9:
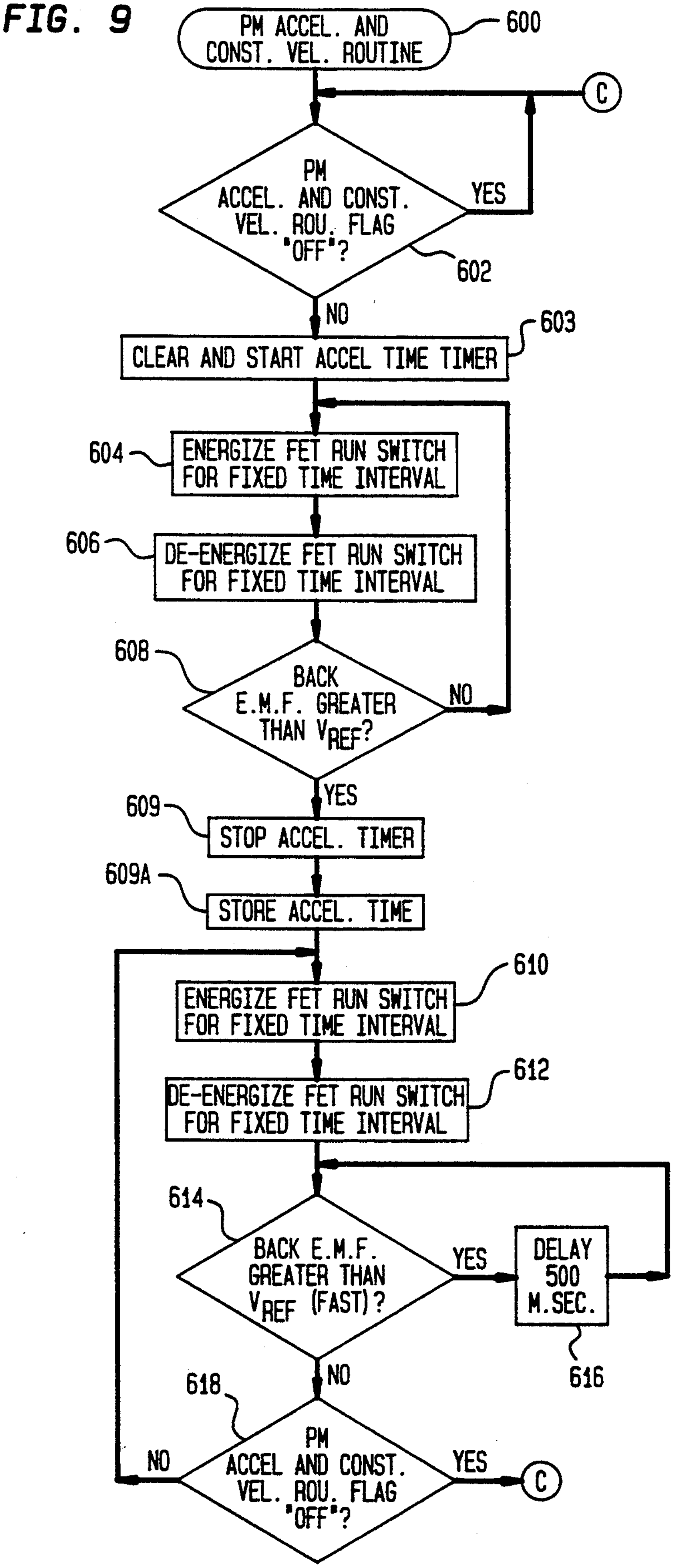
FIG. 9 is a flow chart of the postage meter drum acceleration and constant velocity routine of the microprocessor of FIG. 1, showing the process steps implemented for controlling the rate of acceleration of the postage printing drum, from rest in its home position to a substantially constant sheet feeding and printing speed, and thereafter controlling the drum to maintain the speed constant.

As shown in FIG. 8, according to the invention, the shutter bar routine 500 commences with the step 502 of determining whether or not the shutter bar routine flag setting is "off", due to an error event occurring, such as the shutter bar 72 (FIG. 2) having been stopped in the course of being driven out of or into locking engagement with the drive gear 66 in the course of prior operation thereof. Assuming that the shutter bar routine flag setting is "off", the routine 500 continuously loops through step 502 until the shutter bar routine flag "off" setting has been cleared, i.e., reset to "on", for example due to jam condition thereof having been cured. Assuming as is the normal case that the shutter bar routine flag setting is "on" then, the routine 500 implements the step 503 of clearing a counter for counting the number of positive duty cycle energization pulses the microprocessor 122 (FIG. 2) thereafter applies to the FET power switching module 160 for driving the d.c. motor 140. Thereafter the routine 500 implements the successive steps 504 and 506 of energizing the appropriate lead, 161A or 161B, of FET power switch module 160 (FIG. 2), depending upon the desired direction of rotation of the d.c. motor 140, with a first, fixed, pulse-width-modulated, signal, such as the signal 505, which preferably includes a single positive duty cycle energization pulse of from 500 to 800 microseconds in duration, step 504, followed by a single deenergization time interval of from 500 to 200 microseconds in duration, step 506, so as to provide one energization pulse during a one millisecond time interval. The signal 505, which is amplified by the FET switching module 160 and applied thereby to the d.c. motor 140, thus drives the motor 140 in the appropriate direction of rotation corresponding to the selected lead 161A or 161B, to cause the cam 150 to pivot the shutter bar lever arm 80 in the proper direction about the pivot pin 156 for causing the arm 80 to slidably move the shutter bar 70 partially through the distance $d_2$ for movement thereof either out of or into locking engagement with the drum drive gear 66. Thereafter, the routine 500 (FIG. 8) implements the step 507 of incrementing the pulse counter, cleared in step 503, a single count, followed by the step 508 of determining whether or not the shutter bar sensor 170 (FIG. 3) is blocked due to the shutter bar lobe's leading edge 172, or 174, being sensed thereby, indicating that the movement of the shutter bar 72 (FIG. 2) either out of or into locking engagement with the drum drive gear 66 has commenced. Assuming the shutter bar sensor 170 (FIG. 3) is not blocked, then, the routine 500 (FIG. 8) implements the step 510 of determining whether or not a count of the number of energization pulses applied to the FET switch 140, step 504, has reached a first maximum count of preferably 15 pulses. Assuming the pulse count is less than the maximum count, then, the routine 500 causes processing to be returned to step 504 and to continuously successively implement steps 504, 506, 507, 508 and 510, until either the shutter bar sensor 170 is blocked, step 508, before the pulse count maximizes, step 510, or the pulse count maximizes, step 510, before the shutter bar sensor 170 is blocked, step 508. Assuming the shutter bar sensor 170 is blocked, step 508, before the pulse count maximizes, step 510, then, the routine 500 implements the step 512 of setting a shutter bar sensor blocked flag and returning processing to step 510. Whereupon the routine 500 continuously successively implements steps 510, 504, 506, 507, 508, and 512 until the pulse count maximizes, step 510, followed by implementing the successive steps 514 and 516 of again energizing the appropriate lead, 161A or 161B, of FET switching module 160, depending on the desired direction of rotation of the d.c. motor 140, with a second, fixed, pulse-width-modulated, signal 505, which preferably includes a single positive duty cycle energization pulse of from 250 to 400 microseconds in duration, step 514, and thus a duty cycle which is a predetermined percentage of, i.e., preferably 50% of, the duty cycle of the first pulse-width-modulated signal 505, followed by a single deenergization time interval of from 750 to 600 microseconds in duration, step 516, so as to provide one energization pulse during a one millisecond time interval. On the other hand, with reference to step 508, assuming the shutter bar sensor 170 is not blocked, before the pulse count maximizes, step 510, then, the routine 500 directly implements the successive steps 514 and 516 without having set the shutter bar sensor blocked flag in step 512. Accordingly, whether or not the shutter bar sensor blocked flag is set, step 512, the routine 500 implements the successive steps 514 and 516 of energizing the FET switching module 160 with the second pulse-width-modulated signal 505 hereinbefore discussed. Accordingly, during the initial 15 millisecond time interval of energization of the FET switch, the sensor 170 may or may not have been blocked by the shutter bar 72, that is, the shutter bar 72 may or may not have commenced movement in either direction. And, in either eventuality the FET switching module 160 is again energized to either initially move or continue to move the shutter bar 72. Thereafter, the routine 500 implements the step 517 of incrementing the pulse counter, cleared in step 503, a single count, followed by the 518 determining whether or not the shutter bar sensor 170 is then or was previously blocked. Assuming the shutter bar sensor 170 is not blocked, then, the routine 500 implements the step 520 of determining whether or not the sensor 170 is unblocked and, in addition, whether or not the sensor blocked flag is also set. Thus, the inquiry of step 520 is concerned with the occurrence of two events, that is, that the shutter bar sensor 170 (FIG. 3) becomes blocked and, thereafter, becomes unblocked by the lobe, 166 or 166A. Assuming that the shutter bar sensor 170 is not unblocked, whether or not the blocked sensor flag is set, or that the sensor 170 is unblocked but the blocked sensor flag is not set, then the routine 500 implements the step 522 of determining whether or not the total count of the number of energization pulses applied to the FET switch 140, step 514, has reached a total maximum fault count of preferably 75 pulses. Assuming the total pulse count has not maximized, then, the routine 500 causes processing to be returned to step 514 and to continuously successively implement steps 514, 516, 517, 518, 520 and 522 until the shutter bar sensor is blocked and thereafter unblocked, step 520. Assuming as is the normal case that the shutter bar sensor is blocked, step 518, before the total pulse count has maximized, step 522, then, the routine 500 implements the step 523 of setting the sensor blocked flag before implementing step 520. If however, the shutter bar sensor is not thereafter additionally unblocked, step 520, before the total pulse count has maximized, step 522, it is concluded that either a fault in the postage meter 14, or a jam condition in the base 12, is preventing shutter bar movement. Accordingly, since the pulse count has maximized, step 522, the routine 500 implements the step 524 of setting a shutter bar time out flag, followed by the step 526 of setting the shutter bar routine flag "off" and returning processing to step 502. Whereupon, processing will continuously loop through step 502 until the postage meter fault or jam condition is cured and the shutter bar routine flag is set "on". At this juncture it will be assumed, as is the normal case, that before the total pulse count has maximized, step 522, the shutter bar sensor 170 is timely unblocked after having been blocked, step 520, i.e. typically at the end of a desired predetermined time interval of preferably 30 milliseconds and thus typically when the pulse count is equal to 30. Thus the routine 500 answers the inquiry of step 520, and implements the step 527 of storing the pulse count which, due to each count occurring during successive time intervals of one millisecond, corresponds to the actual time interval required to drive the shutter bar 72 (FIG. 2) through substantially the distance $d_2$, without seating the same, and thus substantially either out of or into locking engagement with drum drive gear 66. Thereafter, in order to slow down movement of the shutter bar 72 (FIG. 2), before the positively seating the same, the routine 500 preferably implements the step 528 (FIG. 8) of causing the microprocessor 122 (FIG. 2) to apply a two millisecond reverse energization pulse, to the FET switch lead 161A or 161B, as the case may be, which is opposite to the lead 161A or 161B to which the energization pulses of steps 504 and 514, were applied. Thereafter, the routine 500 implements the step 530 of delaying routine processing for a fixed time interval, of preferably twenty milliseconds, followed by the step 531 of clearing the pulse counter. Whereupon, in order to positively seat the shutter bar while at the same time easing the shutter bar 72 to a stop to reduce the audible noise level thereof, the routine 500 implements the successive steps 532 and 534 of energizing the FET switching module 160 with a third fixed pulse width-modulated signal, of preferably a single positive duty cycle energization pulse of 500 microseconds in duration, followed by a single deenergization time interval of 10 milliseconds in duration, step 534. Thereafter, the routine 500 implements the step 535 of incrementing the pulse counter cleared in step 531 by a single count, followed by the step 536 of determining whether or not the number of energization pulses applied in step 532 is equal to a predetermined maximum count, of preferably four pulses. Assuming that the pulse count has not maximized, then, the routine 500 returns processing to step 532 and continuously successively implements steps 532, 534 and 536 until the pulse count maximizes step 536. Whereupon the routine implements the step 526 of setting the shutter bar routine flag "off" and returning processing to step 502, which, as hereinbefore discussed, is continuously implemented by the routine 500 until the shutter bar routine flag setting is "on".

As shown in FIG. 9, according to the invention, the postage meter acceleration and constant velocity routine 600 commences with the step 602 of determining whether or not the postage meter acceleration and constant velocity routine flag setting is "off", as is the normal case, until, in the course of execution of the main line program 300 (FIG. 6), the program 300 implements the step 330 of setting the acceleration and constant velocity routine flag "on". Assuming that the acceleration routine flag setting is "off", step 602 (FIG. 9), then, the routine 600 continuously implements step 602 until the "off" flag setting is cleared. Whereupon, the routine 600 implements the step 603 of clearing and starting a time interval timer for measuring the actual time interval required to accelerate the postage printing drum 64 (FIG. 1) from its home position and into printing and feeding engagement with a sheet 22 fed therebeneath. Thereafter, the routine 600 (FIG. 9) implements the successive steps 604 and 606 of energizing the FET run switch 202 (FIG. 2) with a fixed, pulse-width-modulated, signal, such as the signal 605, which preferably includes a single positive duty cycle energization pulse of 1.5 milliseconds in duration, step 604, followed by a single deenergization time interval of 2 milliseconds in duration, step 606, so as to provide one energization pulse having a positive polarity duty cycle during a 3.5 millisecond time interval. Thereafter, the routine 600 implements the step 608 of causing the microprocessor 122 (FIG. 2) to sample the output signal 248 from the comparator 208 to determine whether or not the d.c. motor back e.m.f. voltage signal 210 is greater than the reference voltage signal 214. If the comparator signal 248 indicates that the back e.m.f. voltage is not greater than the reference voltage, step 608 (FIG. 9), it may be concluded that the postage printing drum 24 has not yet completed acceleration to the predetermined constant velocity (FIG. 5), since the reference voltage corresponds to the predetermined constant velocity that the drum 24 (FIG. 1) is preferably driven for feeding and printing postage indicia on sheets 22 at a speed corresponding to the sheet feeding speed of the sheet feeding rollers 44, 52 and 56. Thus if the inquiry of step 608 (FIG. 9) is negative, the routine 600 returns processing to step 604, followed by continuously successively implementing steps 604, 606 and 608 until the d.c. motor back e.m.f. voltage is greater than the reference voltage. Whereupon it may be concluded that the postage printing drum 64 is being driven substantially at the predetermined constant velocity causing the periphery thereof to be driven at the desired sheet feeding and printing speed. Accordingly, the routine 600 then implements the successive steps of stopping the acceleration time interval timer, step 609, followed by the step 609A of storing the actual time interval required for acceleration of the drum 64 (FIG. 1) to the constant velocity (FIG. 5). Thereafter, in order to drive the drum 64 to maintain the velocity constant, the routine 600 (FIG. 9) preferably implements the successive steps 610 and 612 of energizing the FET run switch 202 with a second, predetermined, pulse-width-modulated signal, which preferably includes a single positive duty cycle energization pulse of 4 milliseconds in duration, step 610, followed by a single deenergization time interval of 2 milliseconds in duration, step 612, so as to provide one energization pulse having a positive polarity duty cycle during a six millisecond time interval. Whereupon, the routine 600 implements the step 614, corresponding to step 608, of determining whether or not the d.c. motor back e.m.f. voltage is greater than the reference voltage, indicating that the postage printing drum 64 is being driven faster than the predetermined constant velocity (FIG. 5) corresponding to the reference voltage, and thus faster than the sheet feeding speed of the rollers 44, 52 and 56 (FIG. 1). Assuming that the back e.m.f. voltage is greater than the reference voltage, step 614 (FIG. 9) the routine 600 continuously successively implements the successive steps of delaying routine processing for 500 microseconds, step 616, followed by returning processing to and implementing step 614, until the back e.m.f. voltage is not greater than the reference voltage. At which time it may be concluded that the d.c. motor velocity is less than, but substantially equal to, the constant velocity corresponding to the reference voltage, and thus less than, but substantially equal to, the sheet feeding speed of the sheet feeding rollers 44, 52 and 56. At this juncture, the routine 600 implements the step 618 of determining whether or not the postage meter acceleration and constant velocity routine flag setting is "off", indicating that the constant velocity time interval $t_2$ (FIG. 5) has ended, so as to determine whether or not the drum 64 should or should not be decelerated to the home position. If the flag setting is "on", in order to maintain constant velocity of the drum 64, the routine 600 (FIG. 9) continuously successively implements the successive steps 610, 612, 614, 616 and 618 until the postage meter routine flag setting is "off". On the other hand, if the flag setting is "off", step 618, the routine 600 returns processing to step 602. Whereupon the drum 64 commences coasting and, as hereinbefore discussed, the routine 600 continuously implements step 602 until the postage meter acceleration routine flag is reset to "on".

As shown in FIG. 10, according to the invention, the postage meter deceleration and coasting routine 700 commences with the step 702 of determining whether or not the deceleration and coasting routine flag setting is "off", as is the normal case, until, in the course of execution of the main line program 300 (FIG. 6), the program 300 implements the step 364 of setting the deceleration and coasting routine flag "on". Accordingly, if the inquiry of step 702 (FIG. 10) is negative, the routine 700 continuously implements step 702 until the deceleration and coasting routine flag setting is "on". Whereupon the routine 700 implements the step 704 of setting the acceleration and constant velocity routine flag "off", which, as previously discussed, results the routine 600 (FIG. 9) returning processing to step 602. Thereafter, the routine 700 (FIG. 10) implements the successive steps of delaying routine processing for a time interval of preferably 100 microseconds, step 708, followed by the step 709 of clearing and starting a deceleration time interval timer for measuring the actual time interval required to decelerate the postage printing drum 64 (FIG. 1) out of feeding engagement with a sheet 22 being fed thereby and to return the drum 64 to its home position. Thereafter, in order to commence deceleration of the drum 64, the routine 700 (FIG. 10) initially implements the successive steps 710 and 712 of energizing the FET brake switch 204 (FIG. 2) with a first, fixed, pulse-width modulated signal, such as the signal 707, which preferably includes a single positive duty cycle energization pulse of 4 milliseconds in duration, step 710, followed by a single deenergization time interval of 2 milliseconds in duration, step 712, so as to provide one energization pulse having a positive polarity duty cycle during a 6 millisecond time interval. Then, the routine 700 implements the step 713 of clearing a counter for counting the number of positive duty cycle energization pulses that the microprocessor 122 (FIG. 2) will thereafter apply to FET brake switch 204 in order to continue decelerating rotation of the drum 64 to its home position. Thus the routine 700 (FIG. 10) thereafter implements the successive steps 714 and 716 of energizing the FET brake switch 204 with a second fixed, pulse-width-modulated signal 707, which preferably includes a single positive duty cycle energization pulse of one milliseconds in duration step 714 (FIG. 10), followed by a single deenergization time interval of 2 milliseconds in duration step 716, so as to provide one energization pulse having a positive duty cycle polarity during a 3 millisecond time interval. Whereupon, the routine 700 implements the successive steps of incrementing the pulse counter, cleared in step 713, a single count, followed by the step 718 of determining whether or not the pulse count applied in step 714 is equal to a predetermined maximum count, of preferably 6 pulses. Assuming that the pulse count has not maximized step 718, then the routine 700 returns processing to step 714 and continuously successively implements steps 714, 716 and 718 until the pulse count maximizes, step 718. At this juncture, rotation of the postage printing drum 24 will have been decelerated for a predetermined time interval $t_4$ (FIG. 5) of preferably substantially 24 milliseconds of the 40 milliseconds $t_3$ preferably allotted for returning the drum 64 to its home position. Thus the drum 64 will have been decelerated sufficiently to permit the drum 24 (FIG. 1) substantially to coast to its home position. Accordingly, the routine 700 then implements the step 719 of reducing the value of the reference voltage signal 214 (FIG. 2) provided to the comparator 208 by the microprocessor 122, followed by the successive steps 720 and 722 of energizing the FET run switch 202 with a first, fixed, pulse-width modulated signal 605, which includes a single positive duty cycle energization pulse of preferably 500 microseconds in duration, step 720, followed by a single deenergization time interval of two milliseconds in duration, so as to provide one positive duty cycle energization pulse during a two and one-half millisecond time interval. Whereupon the routine 700 implements the step 724 of commencing determining whether or not the microprocessor 122 (FIG. 2) has received the last transition signal 240, due to the trailing edge 244 (FIG. 4) of the printing lobe 226 being detected by the sensor 232, indicating that the postage printing drum 64 (FIG. 1) has returned to its home position, step 724. Assuming the drum home position signal 240 has not been received, step 724, then, the routine 700 implements the step 726 of causing the microprocessor 122 (FIG. 2) to sample the comparator output signal 248 to determine whether or not the d.c. motor back e.m.f. signal 210 is greater than the reduced reference voltage signal 214. Thus, although the drum 64 will have initially been driven to its home position since the reference voltage has been reduced, the comparator 208 will at least initially indicate that the d.c. motor back e.m.f. voltage is greater than the reduced reference voltage, step 726, (FIG. 10) indicating that the d.c. motor is rotating too fast with the result that the routine 700 will continuously successively implement the successive steps of delaying routine processing for 500 microseconds, step 728, allowing the drum to coast to the home position, followed by again implementing step 726, until the back e.m.f., voltage is no longer greater than the reduced reference voltage. At this juncture it is noted that although the drum home position signal 240 (FIG. 2) has not been received, since the d.c. motor back e.m.f. is less than the reference voltage it may be concluded that the drum 64 has coasted substantially to the home position. Thus, the routine 700 (FIG. 10) then implements the successive steps of stopping the deceleration time interval timer, step 729, set in step 709 followed by storing the actual deceleration time interval, step 729A. Whereupon the microprocessor 122 drives the drum 64 to its home position by returning processing to step 720 and successively implementing steps 720, 722 and 724, with the result that the drum home position signal 240 is received, step 724. Thus, due to utilizing a reduced reference voltage, when comparing the same to the motor back e.m.f. voltage, the drum 64 is permitted to coast under the control of the microprocessor 122 until just prior to returning to its home position, at which juncture the drum is driven to its home position under the control of the microprocessor 122. Thereafter, the routine 700 implements the step 730 of energizing the FET brake switch 204 with a single positive polarity duty cycle pulse of thirty milliseconds in duration, to positively stop rotation of the drum 64 (FIG. 2) at the home position. Whereupon the routine 700 (FIG. 10) implements the successive steps of setting a postage meter cycle end flag for the main line program, step 732, followed by causing the deceleration and coasting routine flag to be set to "off", step 734, and then returning processing to step 702, which, as hereinbefore discussed, is continuously implemented until the postage meter routine deceleration and coasting routine flag setting is "on".

As hereinbefore noted, in the course of implementation of the shutter bar routine 500 (FIG. 8), and, in particular, in the course of implementation of step 527, the actual time interval required to drive the shutter bar 72 (FIG. 2) in either direction through the distance $d_2$ is stored during each sequence of operation of the routine 500 (FIG. 8). Correspondingly, in the course of implementation of the postage meter acceleration and constant velocity routine 600 (FIG. 9) and, in particular in step 609A thereof, the actual time interval required to accelerate the postage printing drum 64, from rest to the desired sheet feeding and printing speed of 26 inches per second, is stored during each sequence of operation of the routine 600 (FIG. 9). And, in the course implementation of the postage meter deceleration and coasting routine 700 (FIG. 10), and, in particular, in step 729A thereof, the actual time interval required to decelerate the postage printing drum 64, from the constant sheet feeding speed thereof to substantially at rest at the home position thereof, is stored during each sequence of operation of the routine 700 (FIG. 10). Moreover, as hereinbefore discussed, each sequence of operation of the shutter bar, acceleration and deceleration routines 500 (FIG. 8), 600 (FIG. 9) and 700 (FIG. 10), is under the control of the main line program 300 (FIG. 6), which preferably includes the step 390, implemented in the course of each sheet 22 being fed through the machine 10, of making successive or parallel determinations as to whether the stored actual value of the time interval for driving the shutter bar in either direction is not equal to the preferred time interval of 30 milliseconds, whether the stored actual values of the time interval for accelerating the postage meter drum is not equal to the preferred time interval of 40 milliseconds, and whether the stored actual value of time interval for deceleration of postage meter drum is not equal to 40 milliseconds, step 390. Assuming the inquiry of step 390 is negative, the routine 300 returns processing it idle, step 306. Assuming however, that the inquiry of step 390 is affirmative, with respect to one or more of the determinations, then, the routine 300 implements the step 392 of selectively changing the duty cycle of the energization pulses provided to the H-bridge FET module 160 (FIG. 2) or FET run switch 202, or both, during each sequence of operation thereof, by predetermined incremental percentages or amounts tending to cause the shutter bar drive motor 140 or postage meter drum drive motor 180, or both, to timely drive the shutter bar 72 or timely accelerate or decelerate the drum 64, as the case may be, in accordance with the preferred, design criteria, time intervals noted above.

Figure 11:
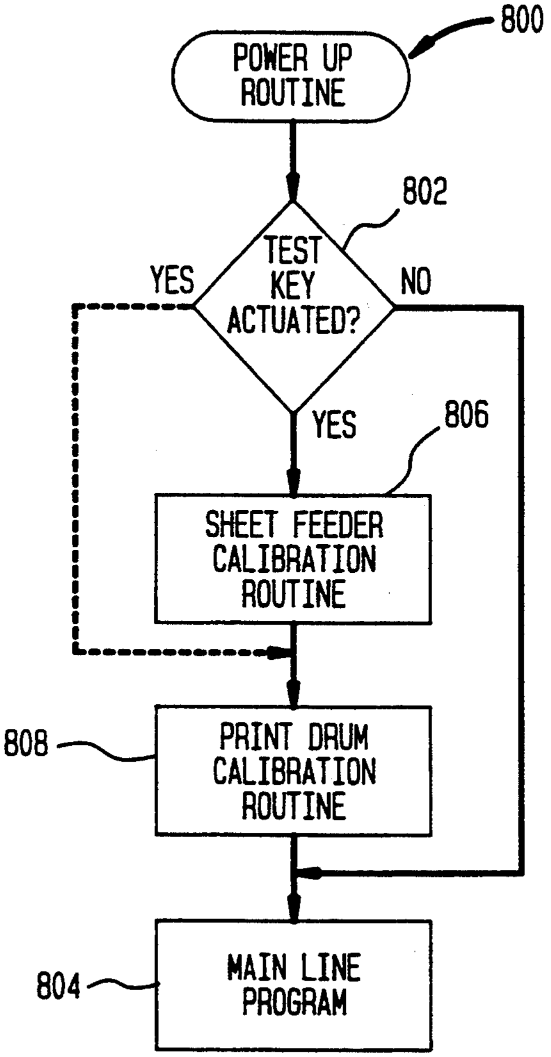
FIG. 11 is a flow chart of the power-up routine of the microprocessor of FIG. 1, showing the process steps implemented for selectively causing the sheet feeding speed calibration routine(s) to be implemented.

As shown in FIG. 11, according to the invention the microprocessor 122 is preferably additionally programmed to include a power-up routine 800 which is called up in response to the operator manually moving the power switch 132 (FIG. 1) to the "on" position thereof to energize the d.c. power supply 122 and thus the mailing machine base 12. The routine 800 preferably commences with the step 802 of determining whether or not the test key 270 (FIG. 1) has been manually actuated, for example at the time of completion manufacture of the mailing machine base 12 or thereafter in the course of the operational life of the base 12, preferably by a qualified manufacturer's representative having access to the test key 270. Assuming that the test key 270 (FIG. 1) is not actuated, step 802 (FIG. 11), the power-up routine 800 implements the step 804 of calling up and commencing implementation of the main line program 300 (FIGS. 6A, 6B and 6C). Whereupon, the main line program 300 is implemented as hereinbefore discussed. On the other hand, assuming the test key 270 (FIG. 1) is actuated, then before implementing the step 804 of calling up and implementing the main line program 300 (FIGS. 6A, 6B and 6C), the routine 800 (FIG. 11) preferably initially implements the step 806 of calling up and implementing the sheet feeder calibration routine 850 (FIG. 12) followed by the step 808 of calling up and implementing the print drum calibration routine (FIG. 13). Alternatively, when the test key 270 (FIG. 1) is actuated, step 802 (FIG. 11) the routine 800 may only call up and implement the print drum calibration routine, step 808.

Figure 12:
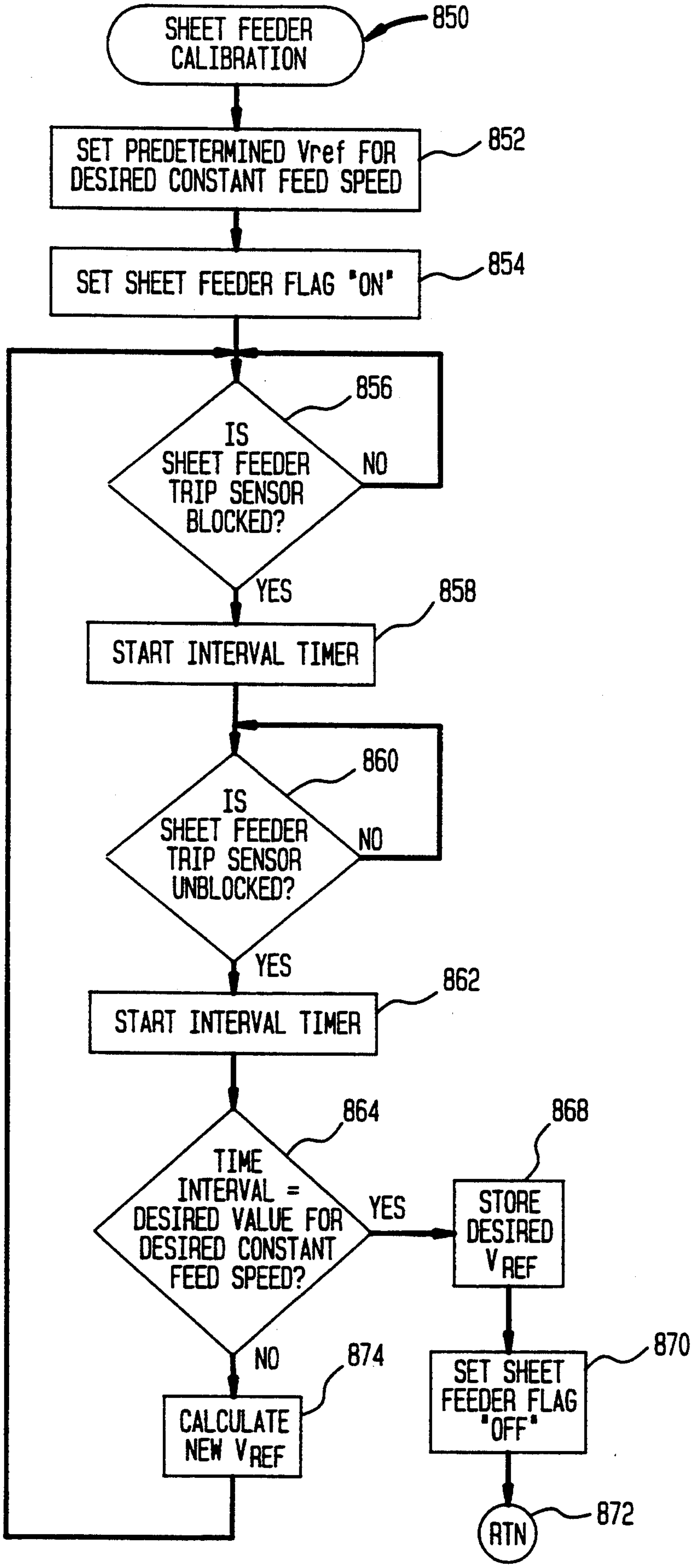
FIG. 12 is a flow chart of the sheet feeder calibration routine of the microprocessor of FIG. 1, showing the process steps implemented for causing the sheet feeding speed of the sheet feeding rollers to be conformed to a predetermined sheet feeding speed.
Figure 13:
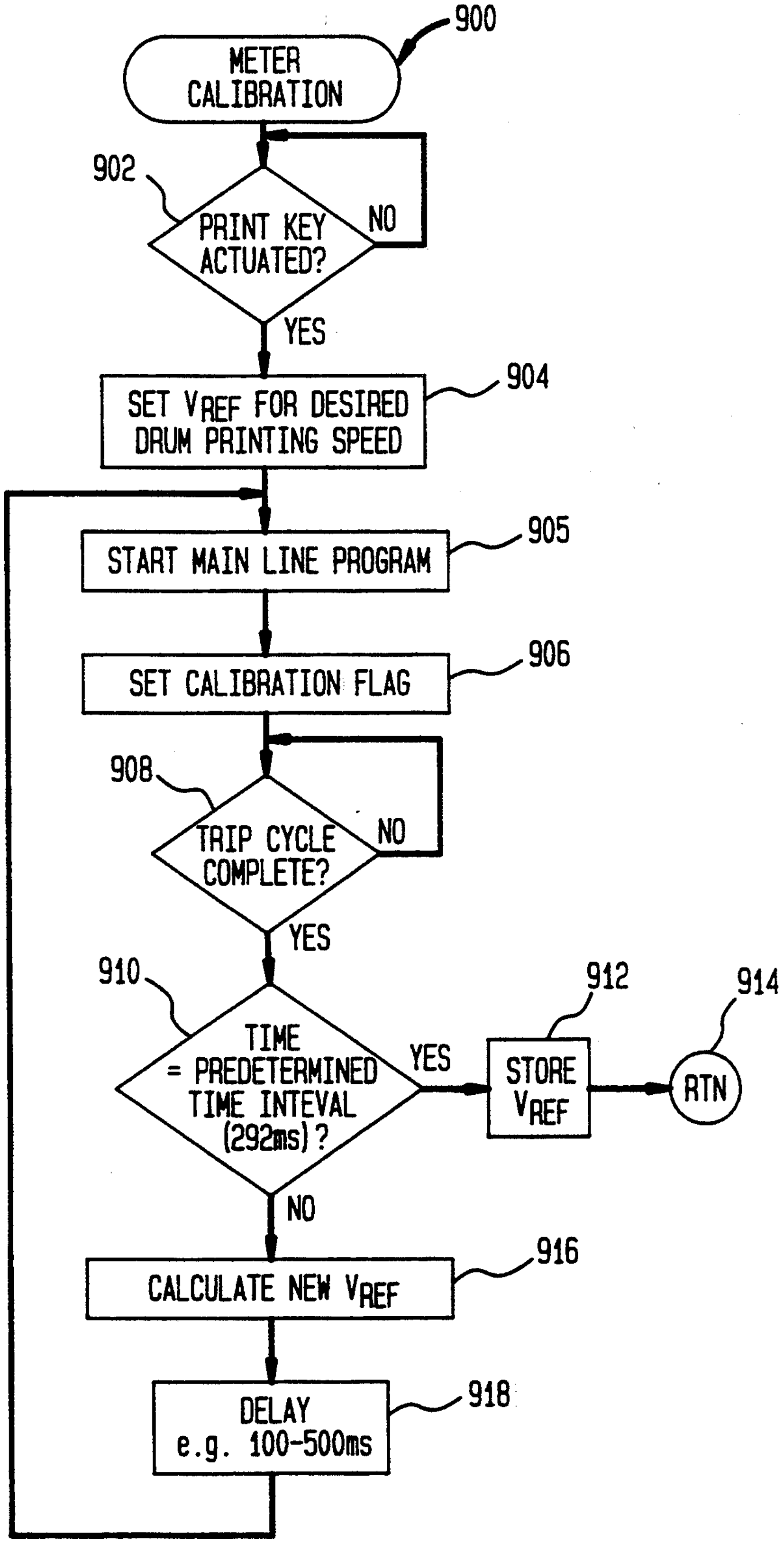
FIG. 13 is a flow chart of the rotary printing drum calibration routine of the microprocessor of FIG. 1, showing the process steps implemented for causing the printing speed of the postage printing drum to be conformed to a predetermined sheet feeding speed.

As shown in FIG. 12, the sheet feeder, or feeding speed, calibration routine 850 commences with the step 852 of causing the microprocessor 122 (FIG. 1) to provide a reference voltage signal 127 (FIG. 1) predetermined by suitable data stored in the non-volatile memory (NVM) 274 of the microprocessor 122, and fetched therefrom for use by the routine 850, to correspond to the desired sheet feeding speed, of twenty-six inches per second, of the sheet feeding rollers 42, 44, 52 and 56. Thereafter the routine 850 implements the step 854 of setting the sheet feeder routine flag "on", which results in the routine 850 calling up and implementing the sheet feeder routine 400 (FIG. 7). As the sheet feeder routine 400 is being implemented, the routine 850 (FIG. 12) concurrently implements the step 856 of determining whether or not the sheet feeder sensing structure 99A (FIG. 1) has detected a sheet 22 fed to the mailing machine base 12, and, assuming that it has not, the routine 850 (FIG. 12) continuously loops through step 856. At this juncture, the operator preferably feeds one of the elongate cut tapes 22A, having a longitudinally-extending length $d_7$ of preferably six inches, to the mailing machine base 12, as a result of which the inquiry of step 856 (FIG. 12) becomes affirmative, and, the routine 850 implements the step 858 of clearing and starting a timer for counting a time interval from the time instant the sensor 99A (FIG. 1) detects the leading edge 100 of the cut tape 22A to the time instant that the sensor 99A detects the trailing edge 100A of the cut tape 22A. Accordingly, subsequent to starting the timer, step 858 (FIG. 12) the routine 850 implements the step 860 of determining whether or not the sensor 99A (FIG. 1) becomes unblocked after having been blocked. That is, whether the sensor 99A has detected the trailing edge 100A of the cut tape 22A. Assuming the sensor 99A has not detected the cut tape trailing edge 100A, step 860 (FIG. 12), the routine 850 continuously successively implements step 860 until the sensor 99A is unblocked after having been blocked. Whereupon, the routine 850 implements the step 862 of stopping the time interval timer, followed by the step 864 of determining whether the actual, measured, time interval for feeding the six inch cut tape 22A (FIG. 1) is equal to the desired time interval for feeding a sheet, i.e., at a constant speed of 26 inches per second. Assuming the measured and desired time intervals are equal, step 864 (FIG. 12), the routine 850 implements the step 868 of storing the predetermined reference voltage of step 852, as the desired reference voltage for subsequent use by the microprocessor 122 (FIG. 1) for, as hereinbefore discussed, causing sheets 22 to be fed at the desired constant sheet feeding speed of 26 inches per second. Thereafter, the routine 850 implements the step 870 of setting the sheet feeding routine flag "off", followed by the step 872 of returning processing to step 808 (FIG. 11) of the power-up routine 800, for implementation of postage meter, or printing speed, calibration routine 900 (FIG. 13). On the other hand, assuming the actual and desired time intervals are not equal, step 864 (FIG. 12), then, the routine 850 implements the step 874 of conventionally calculating a new predetermined reference voltage, for example as by dividing the product of the initial predetermined reference voltage of step 852 and the actual, measured, time interval by the desired time interval. The new predetermined reference voltage as thus calculated will be either greater or less than the initial predetermined reference voltage of step 852, depending upon whether the actual time interval was less than or greater than the desired time interval, step 864. Thereafter the routine of 850 returns processing to step 856. Whereupon the routine 850 again successively implements steps 856, 858, 860, 862 and 864 and thus makes a second determination, step 864, as to whether the measured and desired time intervals are equal. Assuming at this juncture that the inquiry of step 864 is affirmative, the routine 850 then implements the successive steps 868, 870, and 872 of storing in the NVM 274 (FIG. 1) the calculated reference voltage, step 866 (FIG. 12), which resulted in the measured and desired time intervals being found to be equal in step 864, as the new desired, predetermined, reference voltage for subsequent use by the sheet feeding routine 400 (FIG. 7). Assuming however, that the inquiry of step 866 continues to be negative, the routine 850 continuously implements the successive steps 856, 858, 860, 862, 864 and 874 until the measured and desired time intervals are equal, followed by the step 868 of storing the latest calculated reference as the new desired reference voltage for use by the sheet feeding routine 400 (FIG. 7) before implementing the successive step 870 and 872 (FIG. 12) of setting the sheet feeder routine flag "off" and returning processing to the power-up routine 800 as hereinbefore discussed.

As shown in FIG. 13, the postage meter, or printing speed, calibration routine 900 preferably commences with the step 902 of determining whether or not the print key 262 (FIG. 2) is actuated, and, assuming that it is not actuated, continuously successively implements step 902 (FIG. 13) until it is actuated. Whereupon, the routine 900 implements the step 904 of causing the microprocessor 122 (FIG. 2) to provide a reference voltage signal 214 (FIG. 2), predetermined by suitable data stored in the NVM 274 (FIG. 1) of the microprocessor 122 and fetched therefrom for use by the routine 900, corresponding to the desired constant velocity (FIG. 5) at which the postage printing drum 64 (FIG. 2) is to be driven such that the peripheral feeding, or printing, speed thereof corresponds to the preferred sheet feeding speed of 26 inches per second. Thereafter, the routine 900 implements step 905 of causing the main line program 300 (FIGS. 6A, 6B and 6C) to be implemented, followed by the step 906 (FIG. 13) of setting the calibration flag.

As shown in FIGS. 6A and 6B, when the calibration flag is set, step 310, the main line program 300 bypasses step 312, 314, 316, 317, 318, 320 and 320B, which are concerned with operation of the sheet feeding structure (FIG. 1), in response to a sheet 22 being detected by both of the sensing structures 97A and 99A, as hereinbefore discussed in detail. Thus, if the calibration flag is set, step 310, the routine 300 does not implement the step 314 of setting the sheet feeder routine flag "on", as a result of which the sheet feeding routine 400 (FIG. 7) is not implemented. Rather, the routine 300 (FIG. 6B) loops to step 321 to start counting the time delay $t_d$ (FIG. 5), of 80 milliseconds, during which a sheet 22 (FIG. 1) would normally be fed from the time instant it is sensed by the sensor 99A to the time instant acceleration of the postage printing drum 64 is commenced, followed by implementing the step 322 of setting the shutter bar routine flag "on", and then implementing the remainder of the main line program 300, including driving the drum 64 through a single revolution.

Accordingly, after setting the calibration flag, step 906 (FIG. 13), causing the main line program 300 (FIGS. 6A, 6B and 6C) to be concurrently implemented, the routine 900 (FIG. 13) implements the step 908 of determining whether or not the postage meter trip cycle is complete, that is, determining whether or not the postage meter trip cycle complete flag has been set, step 378 (FIG. 6C). Thus the program 900 (FIG. 13) determines whether or not the last transition signal 240 (FIG. 2) has been received by the microprocessor 122, indicating that the trailing edge 244 (FIG. 4) of the printing lobe 226 has been detected by the sensor 232 and thus that the drum 64 (FIG. 1) has been returned substantially to its home position. Assuming that the routine 900 (FIG. 13) makes a determination that the trip cycle is not complete, step 908, then, the routine 900 continuously loops through step 908 until the trip cycle is complete. Whereupon the routine 900 implements the step 910 of determining whether or not the measured, actual, time interval, from the time instant of commencement of constant speed rotation of the drum 64 (FIG. 2) to the time instant that such constant speed rotation is complete, is equal to the desired, predetermined, time interval of 292 milliseconds corresponding to the preferred, predetermined, sheet feeding speed of 26 inches per seconds. In this connection it is noted, as hereinbefore discussed, in the course of implementations of the main line program 300 (FIG. 6C) a time interval counter is cleared, in step 356, to commence counting the actual time interval of constant printing speed of rotation of the drum 64, and, in step 363, upon completion of constant speed rotation, the actual time interval of duration thereof is stored. Accordingly, step 910 (FIG. 13) includes the step of fetching the stored, actual, time interval of duration of constant printing speed of rotation of the drum 64 for comparison with the desired time interval. Assuming that the measured and desired time intervals are equal, the routine 900 implements the step 912 of storing the desired reference voltage of step 904 as the reference voltage for, as hereinbefore discussed causing the drum 64 to feed and print postage indicia at the desired constant printing, and sheet feeding, speed, followed by the step 914 of returning processing to step 804 (FIG. 11) of the the power-up routine 800 for implementation of the main line program 804. On the other hand, assuming the measured and desired time intervals are not equal, step 910 (FIG. 13), then, the routine 900 implements the step 916 of calculating a new predetermined reference voltage which is either greater of less than the initial predetermined reference voltage of step 904, depending upon whether the measured time interval is less than or greater than the desired time interval. Thereafter, the routine 900 implements a selected processing delay of for example 100 to 500 milliseconds, step 918, to permit completion of implementation of other processing routines, including for example the shutter bar routine 500 (FIG. 8), followed by returning processing to step 905 (FIG. 13). Whereupon the routine 900 continuously successively implements steps 905, 906, 908, 910, 916 and 918 until the measured and desired time intervals are equal, step 910. At which time the routine 900 then implements the successive steps 912 and 914 of storing the latest calculated reference voltage, step 916, which resulted in the measured and desired time intervals being found to be equal, step 910, as the new, desired, predetermined, reference voltage for subsequent use by the microprocessor 122 (FIG. 2) for providing the reference voltage signal 214 to the comparator 208 for causing the d.c. motor 180 to drive the drum 64 at the desired printing, and thus sheet feeding, speed of 26 inches per second.

Figure 14:
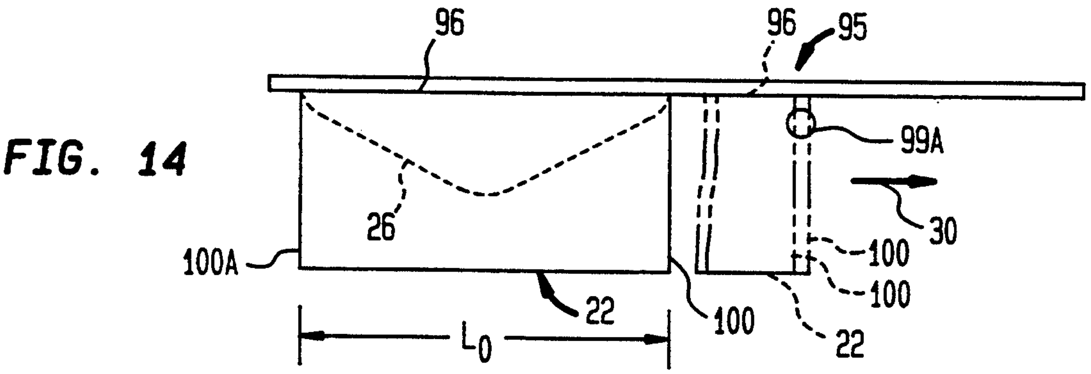
FIG. 14 is a partial, schematic, top plan, view of the mailing machine of FIG. 1, showing successive positions of a sheet relative to the registration fence as the sheet is fed to the sheet sensing structure.

As shown in FIG. 1, assuming as is the normal case, each sheet 22 fed to the mailing machine base 12 is urged by the operator into engagement with the registration fence 95 for guidance thereby downstream in the path of travel 30 to the input feed rollers 42 and 44. Whereupon the sheet 22 is fed downstream by the rollers 42 and 44, in the path of travel 30, with the inboard edge 96 (FIG. 2) thereof disposed in engagement with the registration fence 95 (FIG. 1) and is detected by the sheet feeding trip structure 99. Accordingly, the leading edge 100 of each sheet 22 is fed into blocking relationship with the sheet feeding trip sensor 99A. And, as shown in FIG. 14, since the sensor 99A is located closely alongside of the registration fence 95, the portion of the leading edge 100 of the sheet 22 which is next adjacent to the inboard edge 96 thereof is detected by the sensor 99A. Moreover, as the leading edge 100 of the sheet 22 is progressively fed downstream in the path of travel 30, the magnitude of the analog voltage signal 135 (FIG. 1) provided to the microprocessor 122 by the sensing structure 99 changes from an unblocked voltage maximum $V_{um}$ (FIG. 15) to a blocked voltage minimum $V_b$ of nominally zero volts. Further, the transition time interval $T_t$ during which the voltage magnitude $V_{135}$ of the aforesaid signal 135 changes from 75% of the unblocked voltage maximum $V_{um}$ to 25% thereof is normally substantially 100 microseconds.

Figure 16:
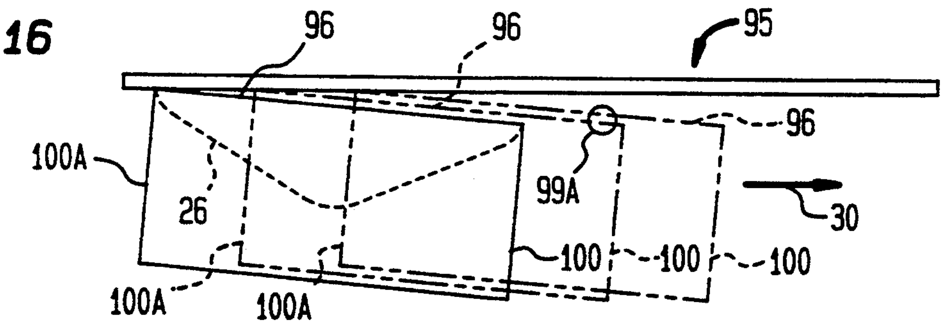
FIG. 16 is a partial, schematic, top plan, view of the mailing machine of FIG. 1, showing successive positions of a sheet which is typically skewed relative to the registration fence as the sheet is fed to the sheet sensing structure.

As shown in FIG. 16, wherein the inboard edge 96 of a given sheet 22 being fed downstream in the path of travel 30 is typically skewed, relative to the registration fence 95, the leading end of the inboard edge 96 is spaced outwardly from the registration fence 95. And, due to the sensor 99A being located close to the registration fence 95, the inboard edge 96, rather than the leading edge 100, of the sheet 22 is fed into blocking relationship with the sensor 99A. Since the sensor 99A is then more gradually blocked by the inboard edge 96 of the moving sheet 22 than it is when the leading edge 100 (FIG. 14) thereof is fed into blocking relationship with the sensor 99A, the transition time interval $T_t$ (FIG. 17) during which the voltage magnitude $V_{135}$ of the aforesaid signal 135 changes from 75% to 25% of the maximum unblocked voltage $V_{um}$ increases.

With the above thoughts in mind, according to the invention the microprocessor 122 (FIG. 1) is preferably programmed to successively sample the signal 135 at two millisecond time intervals and to prevent operation of the postage meter 14, if during any two successive sampling time intervals the voltage magnitude $V_{135}$ (FIG. 17) of the aforesaid signal 135 is equal to or less than 75% of the maximum unblocked voltage but not less than 25% of the maximum unblocked voltage $V_{um}$, in order to prevent improperly locating the postage indicia imprintation on the sheet 22. To that end, as hereinbefore discussed, the main line program 300 (FIG. 6A) preferably includes the step 316A of setting the skew detection routine flag "on", for calling up and implementing a sheet skew detection routine, whenever the main line program 300 is implemented. And, the microprocessor 122 (FIG. 1) is preferably programmed to include the sheet skew detection routine 1000 shown in FIG. 18.

Figure 15:
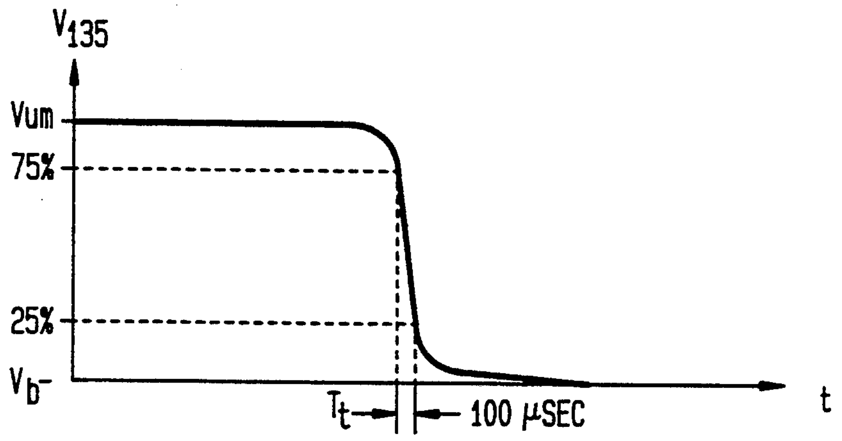
FIG. 15 is a diagram showing a typical voltage versus time profile of the magnitude of the voltage of the signal provided to the microprocessor of FIG. 1 by the sheet sensing structure of FIG. 14 as the sheet is fed into blocking relationship with the sensing structure.
Figure 17:
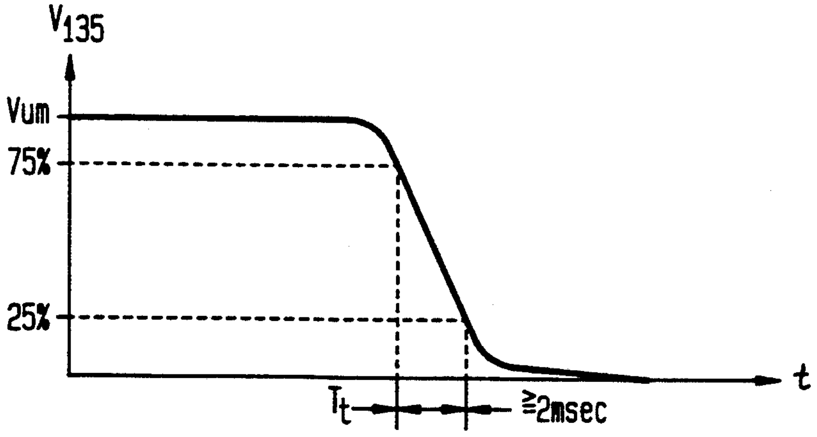
FIG. 17 is a diagram showing a typical voltage versus time profile of the signal provided to the microprocessor of FIG. 1 by the sheet sensing structure of FIG. 16 as the typically skewed sheet is fed into blocking relationship with the sensing structure.
Figure 18:
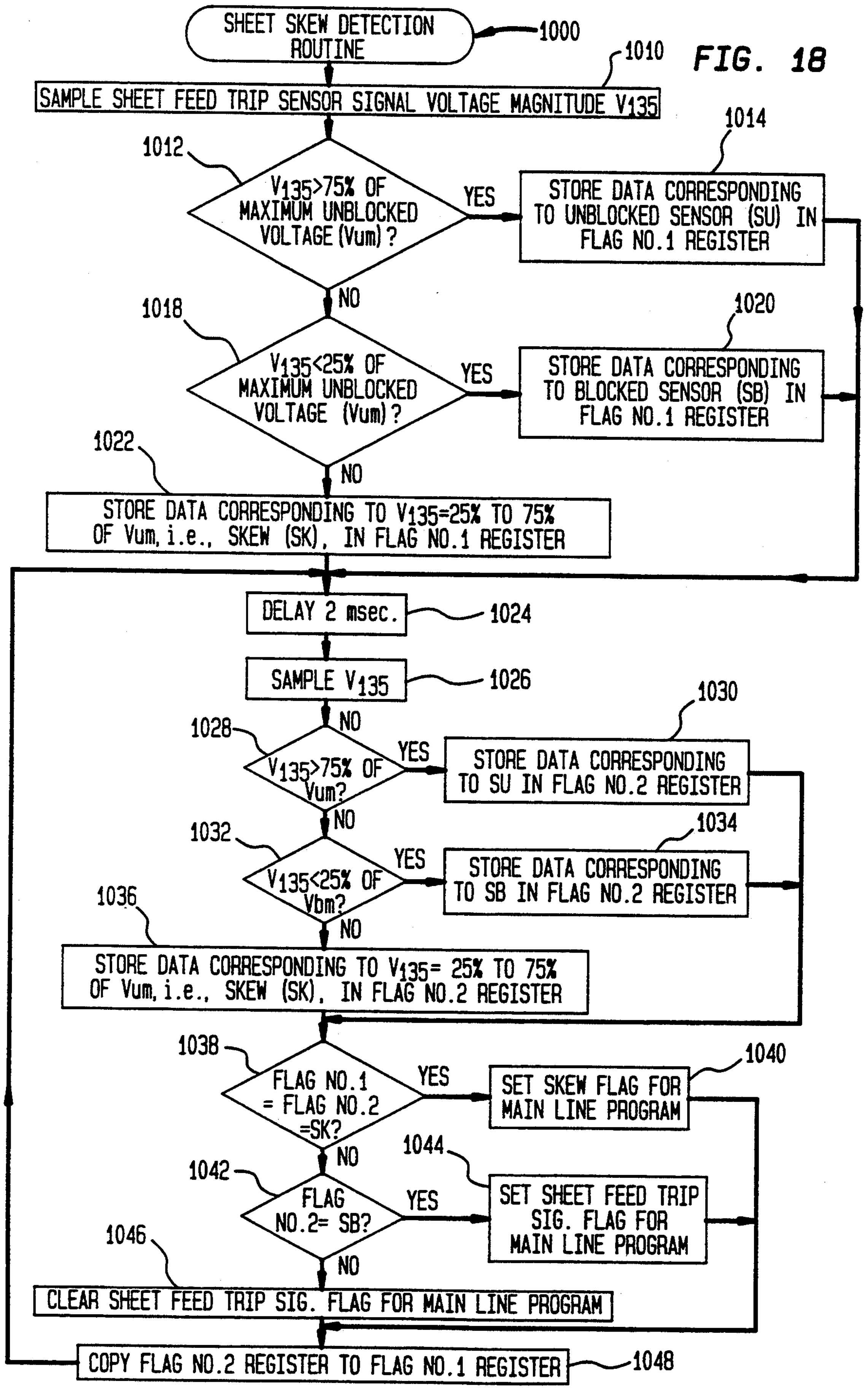
FIG. 18 is a flow chart of the sheet skew detection routine of the microprocessor of FIG. 1, showing the process steps implemented for detecting successive unskewed, and typically skewed, sheets fed to the mailing machine base.

As shown in FIG. 18, the sheet skew detection routine 1000 preferably commences with the step 1010 of sampling the voltage magnitute $V_{135}$ of the signal 135 (FIG. 1) from the sheet trip sensor 99A, followed by the step 1012 (FIG. 18) of determining whether or not the sampled voltage magnitude $V_{135}$ is greater than 75% of the maximum unblocked voltage $V_{um}$. Assuming a sheet 22 (FIG. 14) has not been fed into blocking relationship with the sensor 99A, the inquiry of step 1012 (FIG. 18) will be affirmative, and the routine 1000 will implement the step 1014 of storing data in a predetermined, first, or flag No. 1, register of the microprocessor 122 (FIG. 1), indicating that the sensor 99A is unblocked. Assuming however that the voltage magnitude $V_{135}$ of the sensor voltage signal 135 is not greater than 75% of the maximum unblocked voltage $V_{um}$, step 1012 (FIG. 18), as would be the case if a sheet 22 (FIG. 14) were fed into blocking relationship with the sensor 99A, then, the routine 1000 (FIG. 18) implements the step 1018 of determining whether the actual voltage magnitude $V_{135}$ of the signal 135 is less than 25% of the unblocked voltage maximum $V_{um}$. Assuming that the sheet 22 (FIG. 14) which was fed into blocking relationship with the sensor 99A is not skewed relative to the registration fence 95, or that the sample voltage magnitude $V_{135}$ (FIG. 15) was not made within the 100 microsecond transition time interval when the voltage magnitude $V_{135}$ changed from 75% to 25% of the unblocked voltages maximum $V_{um}$, then, the inquiry of step 1018 (FIG. 18) will be affirmatively answered. Whereupon the routine 1000 implements the step 1020 of storing data in the aforesaid flag No. 1 register indicating that the sensor 99A is blocked. If however a determination is made in step 1018 that the sample voltage magnitude $V_{135}$ is not less than 25% of the maximum unblocked voltage $V_{um}$, then, the routine 1000 assumes that the sample voltage magnitude $V_{135}$, which caused the inquiry of step 1012 to indicate that a sheet 22 had been fed into blocking relationship with the sensor 99A, was made at a time instant when the sheet 22 was either within the 100 microsecond transition time interval $T_t$ as shown in FIG. 15 or within a greater transition time interval $T_t$ as shown in FIG. 17. Accordingly, the routine 100 implements the step 1022 (FIG. 18) of storing data in the flag No. 1 register to indicate that the sample voltage magnitude $V_{135}$ is within the transition time interval $T_t$, or equal to 25% to 75% of the maximum unblocked voltage $V_{um}$. That is, the routine 1000 stores data corresponding to a potential skew condition, SK, in the flag No. 1 register.

After implementation of the appropriate step 1014, 1020 or 1022 (FIG. 18), of storing an unblocked sensor, blocked sensor or potential skewed sheet condition, in the flag No. 1 register, then, the routine 1000 implements the step 1024 of delaying processing for a two millisecond time interval followed by repeating the voltage sampling and analysis processing hereinbefore discussed, but storing the results thereof in a second, predetermined, register. More particularly, the routine 1000 implements the step 1026 of again sampling the voltage magnitude $V_{135}$ of the sheet feed trip sensor signal 135 (FIG. 1), followed by again determining in step 1028 whether the sample voltage magnitude $V_{135}$ is greater than 75% of the maximum unblocked voltage $V_{um}$. Assuming that the inquiry of step 1028 is affirmative, indicating that the sensor 99A is not blocked, the routine 1000 implements the step 1030 of storing data corresponding to an unblocked sensor 99A in a second, predetermined, or flag No. 2, register. On the other hand, assuming that the inquiry of step 1028 is negative, indicating that the sensor 99A is blocked, then, the routine 1000 implements the step 1032 of determining whether the sample voltage magnitude $V_{135}$ is less than 25% of the unblocked voltage maximum $V_{um}$. As previously discussed, assuming that the sheet 22 found to have blocked the sensor 99A in step 1028 is either not skewed or is not within the 100 microsecond transition time interval, then, the inquiry of step 1032 will be affirmative, and the routine 1000 will implement the step 1034 of storing data corresponding to a blocked sensor condition in the flag No. 2 register. On the other hand, if the inquiry of step 1032 is negative, indicating that the sheet 22, found to have blocked the sensor 99A in step 1028, is within the transition time interval $T_t$ (FIGS. 15 or 17), then, the routine 1000 implements the step 1036 of storing data in the flag No. 2 register indicating that the sheet 22 is within the transition time interval $T_t$ and thus that a potential skew condition exists.

After implementation of the appropriate steps 1030, 1034 or 1036 (FIG. 18) of storing data corresponding an unblocked or blocked sensor condition, or potential skewed sheet condition, in the flag No. 2 register, then, the routine 1000 implements the step 1038 of determining whether or not both the flag No. 1 and flag No. 2 registers have potential skew condition data stored therein. Thus, the routine 1000 determines whether two successive sample voltage magnitudes $V_{135}$ of the sheet feeder trip signal 135, made at time instants separated by substantially two milliseconds, both indicate that a sheet 22 is disposed is partial blocking relationship with the sensor 99A, to determine whether or not the sheet 22 is skewed as shown in FIGS. 16 and 17. Accordingly, assuming that both registers have potential skew data stored therein, step 1038, the routine 1000 implements the step 1040 of setting a skew flag for the main line program, which, as shown in FIG. 6, at step 317, results in the main line program 300 implementing the step 317A of setting a machine error flag and causing the keyboard lamp 266 to commence blinking, followed by causing the microprocessor 122 to implement the conventional shut-down routine 340 and, thereafter, the successive steps 340 and 344 hereinbefore discussed. If however, one or the other or both of the flag No. 1 and No. 2 registers do not have data corresponding to a potential skew condition stored therein, step 1038 (FIG. 18), then, the routine 1000 implements the step 1042 of determining whether the flag No. 2 register. has data corresponding to a blocked sensor condition stored therein. Assuming the flag No. 2 register data corresponds to a blocked sensor condition, indicating that the sheet 22 is not within the transition time interval $T_t$ (FIG. 17), and thus that the sheet 22 is not skewed, the routine 1000 implements the step 1044 of setting the sheet feeder trip signal flag for the main line program, which results in the main line program 300 (FIG. 6A) determining, in step 318, that the flag is set, followed by implementing successive steps normally resulting in causing postage indicia to be printed on the sheet 22. On the other hand, if the inquiry of step 1042 is negatively answered, that is, the routine 1000 determines that the data in the flag No. 2 register does not correspond to a blocked sensor condition, indicating that a sheet 22 is not being fed in path of travel 30 to the postage meter 14, the routine 1000 implements the step 1046 of clearing the sheet feeder trip signal flag for the main line program. Whereupon the main line program 300 (FIG. 6A) determines, in step 318, that the sheet feeding trip signal flag is not set, followed by causing the successive steps 316, 316A, 317 and 318 to be implemented until either the skew flag is set, step 317, before the trip signal flag is set, step 318, or the trip signal flag is set, step 318, before the skew flag is set, step 317, as hereinbefore discussed in greater detail.

Accordingly, the routine 1000 (FIG. 18) is constructed and arranged to sample the signal voltage magnitude $V_{135}$ at two millisecond time intervals and to either implement the step 1040, of setting the skew flag to cause the main line program 300 to enter into a shut-down routine rather than cause postage indicia to be printed on the skewed sheet 22, or the step 1044, of setting the sheet feed trip signal flag to cause the main line program 300 to enter into processing eventuating in causing postage indicia to be printed on an unskewed sheet 22, or the step 1046, of clearing the sheet feed trip signal flag to cause the main line program 300 to enter into a processing loop until either a skewed or an unskewed sheet 22 is fed to the machine 10. Thereafter, the routine 1000 implements the step 1048 of copying, i.e., transferring, the contents of the flag No. 2 register into the flag No. 1 register, followed by returning processing to step 1024 for implementation of the two millisecond time delay before again sampling the signal voltage magnitude $V_{135}$, followed by the successive steps 1026–1048 inclusive, as hereinbefore discussed. Accordingly, the routine 1000 is also constructed and arranged to ensure that each successive 2 millisecond sampling of the signal voltage magnitude $V_{135}$ is successively compared in step 1038 to the previous sample voltage magnitude $V_{135}$ in order to successively determine whether or not a given sheet 22 (FIGS. 14, 15, 16 and 17) fed into blocking relationship with the sensor 99A is or is not a skewed sheet 22.

Figure 19:
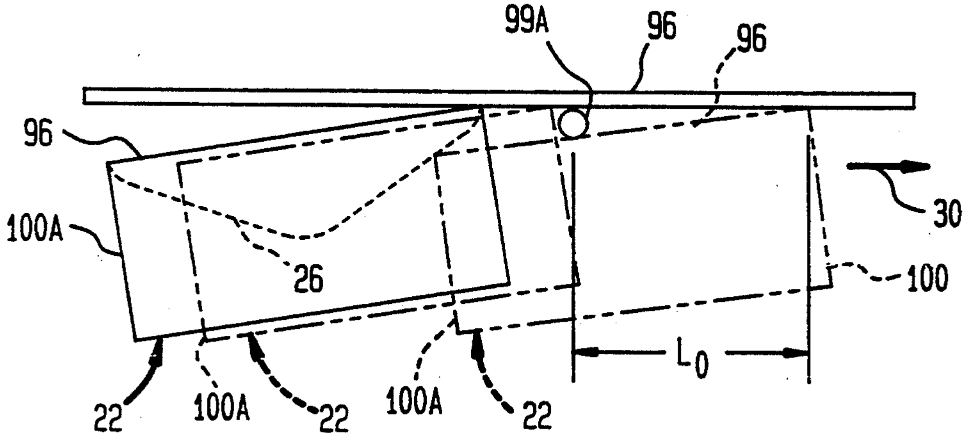
FIG. 19 is a partial, schematic, top plan view of the mailing machine of FIG. 1, showing successive positions of a sheet which is of insufficient length, are measured in the direction of the path of travel thereof, for example due to being atypically skewed relative to the registration fence, as the sheet is fed to the sheet sensing structure.
Figure 20:
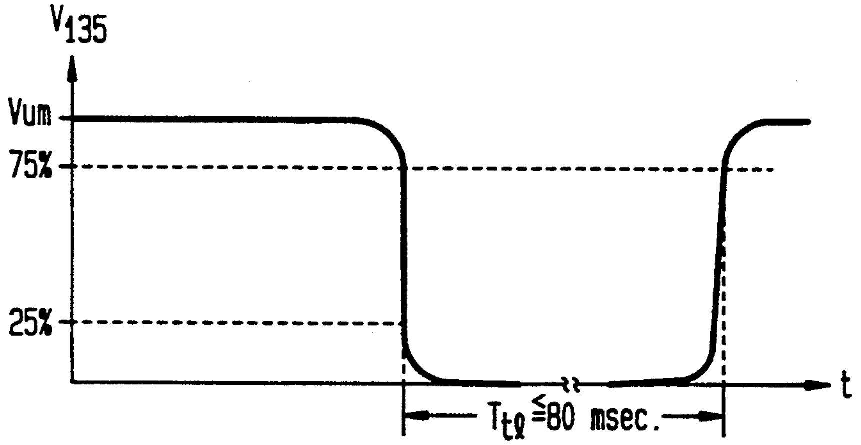
FIG. 20 is a diagram showing a typical voltage versus time profile of the signal provided to the microprocessor of FIG. 1 by the sheet sensing structure of FIG. 19 as a sheet of a predetermined minimum length, as measured in the direction of the path of travel, is fed to the sheet sensing structure.

As shown in FIG. 19, wherein the inboard edge 96 of a given sheet 22 being fed downstream in the path of travel 30 is atypically skewed, relative to the registration fence 95, the trailing end of the inboard edge 96 is spaced outwardly from the registration fence 95. And, although the leading edge 100 of the sheet 22 is fed into blocking relationship with the sensor 99A, the inboard edge 96, rather than the trailing edge 100A, of the sheet 22 is fed out of blocking relationship with the sensor 99A. Under such circumstances and, more generally, whenever the overall length $L_o$ (FIGS. 14 or 19) of a given sheet 22, as measured in the direction of the path of travel 30, is less than a predetermined minimum length, corresponding to a predetermined minimum, sheet-length transition time interval $T_{tl}$ (FIG. 20) of substantially 80 milliseconds, during which the voltage magnitude $V_{135}$ of the sheet feed trip signal 135 changes from 25% of the maximum unblocked voltage $V_{um}$ to 75% of the maximum unblocked voltage $V_{um}$, the overall sheet length $L_o$ is insufficient for postage printing purposes.

With the above thoughts in mind, according to the invention, the microprocessor 122 (FIG. 1) is preferably programmed to prevent operation of the postage meter 14, if a sheet 22 (FIG. 19) fed into blocking relationship with the sensor 99A is fed out of blocking relationship with the sensor 99A before the end of a predetermined time interval of substantially 80 milliseconds. Thus the mailing machine 10 is preferably provided with short sheet length detecting structure. More particularly, as hereinbefore noted in the course of discussing the main line program 300 (FIGS. 6A, 6B and 6C), the main line program 300 is constructed and arranged, through the implementation of steps 321 and 328 thereof, to delay commencement of acceleration of the postage printing drum 64, step 330, for a time interval of substantially 80 milliseconds, after a sheet 22 is fed into blocking relationship with the sensor 99A, causing the sheet feeding trip signal flag to be set, step 318, to permit the shutter bar 68 to be moved out of locking engagement with the drum drive gear 66, steps 322 and 324, and to permit the sheet 22 to be fed downstream in the path of travel 22, from the sensor 99A, for engagement by the postage printing drum 64. Further, as previously noted, when the substantially 80 millisecond time interval has ended, step 328, the program 300 implements the step 329, corresponding to step 318, of determining whether the sheet feed trip signal flag is set. Thus, according to the invention, the microprocessor 122 preferably makes a determination as to whether the sheet 22 found to be disposed in blocking relationship with the sensor 99A, causing the inquiry of step 318 to be affirmatively answered, is still in blocking relationship with the sensor 99A after the predetermined intervening time delay, steps 321 and 328, of substantially 80 milliseconds. Assuming as is the normal case that the inquiry of step 329 is affirmative, then, the program 300 implements the step 330 of setting the postage meter acceleration and constant velocity routine flag "on", followed by initiating processing which, as hereinbefore discussed in detail, normally eventuates in the postage meter 14 printing postage indicia on the sheet 22. On the other hand, if the inquiry of step 329 is negative, indicating that the sheet 22 (FIG. 19) is no longer disposed in blocking relationship with the sensor 99A, then, the main line program 300 (FIG. 6B) preferably implements the step 329A of setting a machine error flag and causing the keyboard lamp 266 to commence blinking, followed by causing the microprocessor 122 to implement the conventional shut-down routine 340 and, thereafter, the successive steps 340 and 344, hereinbefore discussed in detail.

Accordingly, the main line program 300 is constructed and arranged to sample the signal voltage magnitude $V_{135}$ (FIG. 20) both before and after a substantially 80 millisecond time delay $t_d$ (FIG. 5) and to enter into a shut-down routine rather than cause postage indicia to be printed on the sheet 22, if the second sample voltage magnitude $V_{135}$ indicates that the overall longitudinal length $L_o$ of the sheet 22 (FIGS. 14 or 18), as measured in the direction of the path of travel 30, is not more than a predetermined length of substantially two inches. In this connection it is noted that assuming that a given, atypical, sheet 22, exemplified by the atypically skewed sheet 22 shown in FIG. 19, is fed downstream in the path of travel 30 at the preferred, design criteria, speed of substantially 26 inches per second, the sheet 22 will be fed into and out of blocking relationship with the sensor 99A during a sheet-length, transition time interval $T_{t1}$ of substantially 80 milliseconds, which corresponds to an overall sheet length $L_o$ (FIG. 19), as measured in the direction of the path of travel 30, of substantially two inches.

What is claimed is:

1. A mailing machine base including a sheet feeding apparatus, said sheet feeding apparatus comprising:
   (a) means for feeding a sheet having a leading edge and a trailing edge in a path of travel, the sheet feeding means including a roller, the sheet feeding means including means for driving the roller at a desired sheet feeding speed corresponding to a desired reference voltage;
   (b) means for controlling the sheet feeding means, the controlling means including a microprocessor connected to the roller driving means, the controlling means including means for sequentially sensing the leading and trailing edges of the sheet in the path of travel and providing corresponding successive signals to the microprocessor;
   (c) the sheet having a predetermined length from the leading edge to the trailing edge thereof; and
   (d) the microprocessor programmed for
      1. providing a predetermined reference voltage corresponding to the desired sheet feeding speed,
      2. counting a time interval in response to receiving the successive leading and trailing edge signals,
      3. determining whether the counted time interval and the desired time interval are substantially equal, and
      4. storing the predetermined reference voltage as the desired reference voltage if the counted and desired time intervals are substantially equal.

2. The mailing machine base according to claim 1, wherein the microprocessor is programmed for changing the predetermined reference voltage to a new predetermined reference voltage if the counted and desired time intervals are not substantially equal.

3. The mailing machine base according to claim 1, wherein the microprocessor is programmed for storing the desired time interval.

4. The mailing machine base according to claim 1 including a non-volatile memory for storing the desired reference voltage.

5. The mailing machine base according to claim 1, wherein the sheet is a cut tape.

6. The mailing machine base according to claim 1, wherein the predetermined reference voltage was previously stored as the desired reference voltage, and the programming for providing the predetermined reference voltages includes fetching the predetermined reference voltage.

7. The mailing machine base according to claim 1, wherein the microprocessor is programmed for causing the roller driving means to start driving the roller at a sheet feeding speed corresponding to the predetermined reference voltage, and the microprocessor is programmed for causing the driving means to stop driving the roller if the predetermined reference voltage is stored as the desired reference voltage.

8. The mailing machine base according to claim 1 including switching means connected to the microprocessor and operable to permit the microprocessor to implement steps 1–4 when the sheet is fed to the base.

9. The mailing machine base according to claim 8, wherein the switching means includes a manually operable test key normally inaccessible to an operator of the base, and the test key is normally accessible to and operable by the manufacturer of the base.

10. The mailing machine base according to claim 1, wherein the microprocessor is programmed for calculating a new predetermined reference voltage if the counted and desired time intervals are not substantially equal.

11. The mailing machine base according to claim 10, wherein the microprocessor is programmed for repeating steps 2 and 3 if the new predetermined reference voltage is calculated, and the microprocessor is programmed for storing the new predetermined reference voltage as the desired reference voltage if the counted and desired time intervals are substantially equal when steps 2 and 3 are repeated.

12. The mailing machine base according to claim 11, wherein the microprocessor is programmed for causing the roller driving means to start driving the roller at a sheet feeding speed corresponding to the predetermined voltage, the microprocessor is programmed for causing the driving means to drive the roller at a sheet feeding speed corresponding to the new predetermined reference voltage after the new predetermined reference voltage is calculated, and the microprocessor is programmed for causing the driving means to stop driving the roller if the new predetermined reference voltage is stored as the desired reference voltage.

13. In a mailing machine base including a sheet feeding apparatus, said sheet feeding apparatus including means for feeding a sheet having a leading edge and a trailing edge in a path of travel, wherein the sheet feeding means includes a roller and means for driving the roller at a desired sheet feeding speed corresponding to a desired reference voltage, and the base including means for controlling the sheet feeding means, wherein the controlling means includes a microprocessor connected to the roller driving means, and wherein the controlling means includes means for sequentially sensing the leading and trailing edges of the sheet in the path of travel and providing corresponding successive signals to the microprocessor, a process for calibrating the sheet feeding speed of the roller comprising:

(a) providing the sheet with a predetermined length from the leading edge to the trailing edge thereof; and (b) programming the microprocessor for 1. providing a predetermined reference voltage corresponding to the desired sheet feeding speed,
2. counting a time interval in response to receiving the successive leading and trailing edge signals,
3. determining whether the counted time interval and the desired time interval are substantially equal, and
4. storing the predetermined reference voltage as the desired reference voltage if the counted and desired time intervals are substantially equal.

14. The process according to claim 13 including programming the microprocessor for changing the predetermined reference voltage to a new predetermined reference voltage if the counted and desired time intervals are not substantially equal.

15. The process according to claim 13 including programming the microprocessor for storing the desired time interval.

16. The process according to claim 13 including providing a non-volatile memory for storing the desired reference voltage.

17. The process according to claim 13 wherein the step of providing the sheet includes providing a cut tape sheet.

18. The process according to claim 13, wherein step 1 includes the steps of storing the predetermined reference voltage as the desired reference voltage and fetching the predetermined reference voltage.

19. The process according to claim 13 including programming the microprocessor for causing the roller driving means to start driving the roller at a sheet feeding speed corresponding to the predetermined reference voltage, and programming the microprocessor for causing the driving means to stop driving the roller if the predetermined reference voltage is stored as the desired reference voltage.

20. The process according to claim 13 including providing switching means connected to the microprocessor and operable to permit implementation of the process.

21. The process according to claim 20, wherein the step of providing the switching means includes providing a manually operable test key normally inaccessible to an operator of the base and normally accessible to and operable by the manufacturer of the base.

22. The process according to claim 13 including programming the microprocessor for calculating a new predetermined reference voltage if the counted and desired time intervals are not substantially equal.

23. The process according to claim 22 including programming the microprocessor for repeating steps 2 and 3 if the new predetermined reference voltage is calculated, and programming the microprocessor for storing the new predetermined reference voltage as the desired reference voltage if the counted and desired time intervals are substantially equal when steps 2 and 3 are repeated.

24. The process according to claim 23 including programming the microprocessor for causing the roller driving means to start driving the roller at a sheet feeding speed corresponding to the predetermined voltage, programming the microprocessor for causing the driving means to drive the roller at a sheet feeding speed corresponding to the new predetermined reference voltage after the new predetermined reference voltage is calculated, and programming the microprocessor for causing the driving means to stop driving the roller if the new predetermined reference voltage is stored as the desired reference voltage.

* * * * *